May 24, 1949.    R. C. DEHMEL    2,471,315
AIRCRAFT TRAINER FOR AERIAL GUNNERS
Filed Feb. 3, 1944    6 Sheets-Sheet 1

INVENTOR
R.C. DEHMEL
BY: P. C. Smith
ATTORNEY

INVENTOR
R.C. DEHMEL
BY: P.C. Smith
ATTORNEY

May 24, 1949.    R. C. DEHMEL    2,471,315
AIRCRAFT TRAINER FOR AERIAL GUNNERS

Filed Feb. 3, 1944    6 Sheets-Sheet 3

INVENTOR
R. C. DEHMEL
BY P. C. Smith
ATTORNEY

INVENTOR
R.C. DEHMEL
BY: P. C. Smith
ATTORNEY

May 24, 1949.    R. C. DEHMEL    2,471,315
AIRCRAFT TRAINER FOR AERIAL GUNNERS
Filed Feb. 3, 1944    6 Sheets-Sheet 5

INVENTOR
R.C. DEHMEL
BY P.C. Smith
ATTORNEY

May 24, 1949.  R. C. DEHMEL  2,471,315
AIRCRAFT TRAINER FOR AERIAL GUNNERS

Filed Feb. 3, 1944  6 Sheets-Sheet 6

INVENTOR
R. C. DEHMEL
BY
P. C. Smith
ATTORNEY

Patented May 24, 1949

2,471,315

UNITED STATES PATENT OFFICE 2,471,315

AIRCRAFT TRAINER FOR AERIAL GUNNERS

Richard C. Dehmel, Summit, N. J., assignor to Bell Telephone Laboratories, Incorporated, New York, N. Y., a corporation of New York Application February 3, 1944, Serial No. 520,912

27 Claims. (Cl. 35—25)

This invention relates to aircraft training apparatus and more particularly to apparatus applicable thereto for enabling the training of a pilot or gunner in aircraft gunnery.

Radio equipment has been developed which directively radiates high frequency impulses and measures the strength and time delay of waves which are reflected back from interposed objects. When such equipment is used in airplanes its antennae or radiators are directively oscillated to scan a wide angle field ahead of the airplane. Through synchronized circuits the reflected waves form images on oscilloscope screens which have intensities and coordinate positions corresponding to the degree of reflection and location of the object scanned by the transmitted beam. Since only relatively dense objects produce images the equipment is particularly effective in showing the location of ships or in spotting other airplanes through clouds or darkness. The time of delay between the transmission of any impulse and the reception of the returning wave is a measure of the distance from the transmitter to the reflecting object. This may be indicated on one oscilloscope screen serving as a range oscilloscope and the coordinate position of the object with respect to the transmitter may be indicated on a second oscilloscope screen serving as a location oscilloscope.

The use of equipment of this type is highly important in military operations since it may be employed to locate enemy aircraft at night or through clouds, to locate enemy ships, to locate aircraft carriers lost by pilots in overcasts at sea or to direct gunnery or bombing. Commercially this equipment will become important to transport pilots as a means for detecting the presence of other airplanes on airways and as an aid to landing. Like other navigation aids, experience is required in the operation of the equipment to acquire efficiency in its use. However, to avoid loss of time, the hazards and the expense of training with actual service equipment, it is desirable that equipment may be available to enable the aircraft operating personnel to be taught on the ground to fly airplanes by instruments and to coordinate the flight with information received by the radio equipment.

It is therefore the object of the present invention to simulate in an aircraft trainer the reception which would be attained on actual radio direction and range finding equipment.

A feature of the invention is the provision of equipment for securing the instant coordinate locations of the trainer and an assumed target, which may be a second trainer or an assumed fixed objective simulating, for example, a ship at sea level, and combining such coordinates to secure the azimuth and elevation angles of the flight path which should be flown by the trainee to reach the objective or target, or which would cause a gun if carried by the trainer to be properly trained with respect to the target and to secure the distance or slant range from the trainer to the objective or target.

Another feature of the invention is the provision of equipment whereby the securing of the azimuth and elevation angles of the flight path may be caused to operate a location indicator to produce an image on its screen representing the location of the distant objective or target with respect to the trainer toward which the trainer flight should bear.

Another feature of the invention is the provision of apparatus whereby the image is displaced on the screen in accordance with the simulation in the trainer of any pitch, bank or turning movements during the simulated flight.

Another feature of the invention is the provision of equipment whereby the distance or slant range measurement from the trainer to the objective or target, as secured by combining the coordinate locations of the trainer and target, is utilized to operate a range oscilloscope or indicator of range to produce an image at a scale point on its screen indicative of such distance or slant range.

A further feature of the invention is the provision of a key simulating a gun firing key which is effective only when the target is at the proper position on the screen of the location oscilloscope, to correspond to the lead at which a gun would be accurately trained on the target, to cause the target simulating images appearing on the screens of the oscilloscopes to become respectively depressed and dark thereby simulating the target as hit and sinking or falling and with a changed range.

In accordance with one embodiment of the present invention, potentiometers which are controlled by the course charting apparatus of an aircraft trainer and a potentiometer controlled by the altimeter driving motor of the trainer are provided to apply potentials to three summing amplifiers which potentials have instant values proportional to the $x_1$, $y_1$ and $z_1$ Cartesian coordinates of the position of the trainer with respect to a reference point on the terrain map over which the simulated flight is being made. At the same time similar equipment at the objective or target which may, for example, be another trainer, applies potentials to the three summing amplifiers which potentials have instant values proportional to the $x_2$, $y_2$ and $z_2$ Cartesian coordinates of the position of the objective with respect to the same reference point on the terrain map. The summing amplifiers combine these potentials and from the results determine potentials which are proportional to the $x$, $y$ and $z$ Cartesian coordinates of the flight path from the first trainer to the objective or target. Since polar coordinates are better adapted than rectangular coordinates to the control of instruments for indicating a location and range in space, these coordinate potentials are electrically converted into polar coordinate potentials indicative of the range $r$, the azimuth angle $\alpha$ and the elevation angle $\epsilon$, defining the length and direction of the flight path over which the trainer should be flown to reach the target or to cause a gun if carried by the trainer to be properly trained with respect to the target and to secure the range from the trainer to the target.

The range potential thus secured is used to control an oscilloscope to produce an image at a scale point on its screen indicative of the range or distance from the trainer to the target or to operate a voltmeter type of indicator the pointer of which is deflectable in accordance with the range.

The azimuth angle $\alpha$ and the elevation angle $\epsilon$ potentials are utilized to control the operation of servo-motors which rotate the brushes of potentiometers carried by their shafts through angular positions proportional to the values of the $\alpha$ and $\epsilon$ potentials and thus, with the potentiometer windings connected to sources of direct current, to produce potentials between the brushes of each potentiometer proportional respectively to the $\alpha$ and $\epsilon$ angles. These potentials may then be applied across the horizontal and vertical plates of an oscilloscope to position an image representing the target which is indicative of the position of the target with respect to the position of the trainer, assumed to be at the intersection of the cross hairs of the oscilloscope screen.

However, the instant attitude of the trainer, that is, whether it is simulating the yawing movement of an airplane about its vertical axis in response to steering, whether it is simulating the rotational movement of an airplane about its lateral axis in a pitching movement which may be due to either climbing or diving, and whether it is simulating the rolling movement of an airplane about its longitudinal axis which would occur in banking, influences the position of the image of the target as it appears on the screen of the location oscilloscope. The simulation of the yawing movement appears as a change in the indications of the compass and turn indicator of the trainer and by the movement of the course charting apparatus, the simulation of the pitching movement appears as a raising or lowering of the horizon bar of the artificial horizon instrument and the operation of the altimeter and the simulation of the rolling movement appears as a change in the slope of the horizon bar of the artificial horizon instrument. Therefore, to introduce corrections for these movements, the winding of the $\alpha$ angle potentiometer is mounted for rotation by the steering motor of the trainer which responds to the steering control exercised by the trainee, and as a consequence of the rotation of the brushes in proportion to the $\alpha$ angle and the rotation of the winding in proportion to the steering or heading angle $\beta$ a corrected azimuth angle potential $\alpha \pm \beta$ is produced. Similarly the winding of the $\epsilon$ angle potentiometer is mounted for rotation by the motor which controls the horizon bar of the artificial horizon instrument of the trainer in response to the operation of the elevator control of the trainer for climbing or diving and, as a consequence of the rotation of the brushes in proportion to the $\epsilon$ angle and the rotation of the winding in proportion to the climbing or diving angle which may be designated $\omega$, a corrected elevation angle potential $\epsilon \pm \omega$ is produced. These potentials are applied to the opposite points of two sine-cosine potentiometers, the sine and cosine brushes of which are mounted on a shaft driven by the motor which controls the tipping of the horizon bar of the artificial horizon instrument to indicate the angle $\delta$ of roll. The sine and cosine potentials derived from the potentiometers are then applied to summing amplifiers the output potentials of which have values proportional to the corrected $\alpha_c$ and $\epsilon_c$ location angles of the target with respect to the trainer. These potentials are then applied across the horizontal and vertical plates of the location oscilloscope.

From an observation of the position of the target image on the screen of the location oscilloscope the trainee may control the trainer until the image coincides with the intersection point of the cross hairs of the screen at which time the simulated flight path will be in exact coincidence with the path from the trainer to the target. This would be the correct instant for the firing of a gun to score a hit on the target except for the necessary lead.

To simulate gunnery a gun firing or trigger release key and three relays are provided. Two of these relays are of the voltmeter type. One of them has its winding connected across the horizontal plates of the location oscilloscope and is designed so that its vane is positioned midway between its contacts and out of engagement therewith when the potential across its winding is equal to the potentials required to center the image horizontally on the oscilloscope screen. The other of the voltmeter relays has its winding connected across the vertical plates of the location oscilloscope and is designed so that its vane is positioned midway between its contacts and out of engagement therewith when the potential across its winding is equal to the potential required to center the target image vertically on the screen. The third relay is normally held operated over the normally closed contacts of the trigger release key and is also held operated over contacts of either or both of the voltmeter relays if the potentials applied across the plates of the oscilloscope are not such as to center the target image on the screen. Hence if the image is exactly centered on the screen, which is the position when guns would be pointed directly at the target the third relay is held operated only by the trigger release key. If at this instant the key is operated the third relay releases and changes the output potential from one summing amplifier to alter the coordinate potential $z$ which in turn causes the resetting of the servo-motors for a new value of the elevation angle $\epsilon$ and causes a new value of the polar coordinate indication of the slant range $r$. With these values changed the position of the image of the target on the screen of the location oscilloscope is depressed to show that the target has been hit and to depict it as falling to the ground and the setting of the range indicator is changed to show the change in range.

In lieu of equipment being used to simulate two airplanes in flight, fixed potentials may be introduced at the summing amplifiers instead of the variable potentials $x_2$, $y_2$, $z_2$ supplied by the second trainer and thereby simulate stationary objects in the air or on the ground, or the potentials $x_2$, $y_2$ may be varied and the potential $z_2$ made zero to simulate a ship at sea or an object moving on the ground.

In accordance with a further embodiment of the invention, a first trainer is provided with a potentiometer which is controlled by a motor of the trainer operative in accordance with the air speed of the simulated flight, which potentiometer applies a potential varying in accordance with the simulated air speed upon a second sine-cosine potentiometer whose brushes are driven by the motor of the trainer operative to raise or lower the horizon bar of the artificial horizon instrument of the trainer to indicate the climb or diving movement of the simulated flight, from which potentiometer potentials are derived which have instant values proportional to the $As z_0$ and horizontal projection Cartesian ($Ash$) coordinates of the position of the trainer with respect to a reference point on the terrain map over which the simulated flight is being made. The horizontal projection potential $Ash$ is further applied to a third potentiometer, the brushes of which are controlled by a motor operative in accordance with the compass heading of the simulated flight from which potentiometer potentials are derived which have instant values proportional to the $As x_0$ and $As y_0$ Cartesian coordinates of the position of the trainer with respect to a reference point on the terrain map over which the simulated flight is being made. The $As x_0$, $As y_0$ and $As z_0$ potentials are then impressed upon three amplifiers, the output circuits of which are connected respectively to the control phase stator windings of the two-phase motors of three motor generator assemblies. The fixed phase stator windings of the motors and generators are energized from a source of steady alternating current potential and the other stator windings of the generators are connected to apply feedback potentials to the associated amplifiers whereby the amplifiers are controlled to cause the generators to be driven at speeds which vary linearly with respect to the input potentials.

The output potentials $x_1$, $y_1$ and $z_1$ from the generators are also applied to the inputs of three summing amplifiers. At the same time similar equipment of a second trainer applies potentials to the three summing amplifiers which potentials have instant values proportional to the $x_2$, $y_2$ and $z_2$ Cartesian coordinates of the position of the second trainer with respect to the same reference point on the terrain map. The summing amplifiers combine these potentials and from the results determine potentials which are proportional to the $x$, $y$ and $z$ Cartesian coordinates of the flight path between the two trainers. These coordinate potentials are then electrically converted into polar coordinates which are indicative of the range $r$, the azimuth angle $\alpha$ and the elevation angle $\epsilon$ defining the length and direction of the flight path over which either trainer should be flown to reach the other trainer or to cause a gun if carried by either trainer to be properly trained with respect to the other trainer and to secure the distance or range between the trainers.

The range potential thus derived is used to control indicating instruments associated with the respective trainers to produce scale readings indicative of the range or distance between the trainers. The azimuth angle potential $\alpha$ thus derived is used to drive a servo-motor which rotates one input shaft of each of two differential gear boxes allocated respectively to the two trainers. The other input shafts of the two gear boxes are driven by the motors which drive the compasses of the two trainers. The output shafts of the gear boxes are connected to the brush shafts of potentiometers whereby, with the servo-motor driven input shafts of the gear boxes oriented 180 degrees apart in rotational spacing, the brushes of the two potentiometers are so driven that the potentials derived from the windings of such potentiometers vary in accordance with the $\alpha$ angle as modified by the instant value of the heading or compass angle $\beta$ or $\alpha_1 \pm \beta_1$ in response to the simulated yawing movement of the first trainer about its vertical axis and $\alpha_2 \pm (\beta_2 + 180°)$ in response to the simulated yawing movement of the second trainer about its vertical axis.

The elevation angle potential $\epsilon$ is used to drive a second servo-motor which turns one input shaft of each of two other differential gear boxes allocated respectively to the two trainers. The other input shafts of these gear boxes are driven by the motors which elevate or depress the horizon bars of the artificial horizon instruments of the two trainers. The output shafts of these gear boxes are connected to the brush shafts of two potentiometers whereby, with the servo-motor driven input shafts of the gear boxes oriented 180 degrees apart in rotational spacing, the brushes of these potentiometers are so driven that the potentials derived from the windings of such potentiometers vary in accordance with the $\epsilon$ angle modified by the instant value of the climbing or diving angle $\omega$ or $\epsilon_1 \pm \omega_1$ in response to the simulated pitching movement of the first trainer about its lateral axis and $\epsilon_2 \pm (\omega_2 + 180°)$ in response to the simulated pitching movement of the second trainer about its lateral axis.

These potentials are applied to the opposite points on the windings of a pair of sine-cosine potentiometers associated with each trainer, the brushes of which potentiometers are mounted on a shaft driven by a motor which controls the tipping of the horizon bar of the artificial horizon instrument to indicate the angle $\delta$ of roll. The sine and cosine potentials derived from these potentiometers are then applied to summing amplifiers, the output potentials of which have values proportional to the corrected $\alpha_c$ and $\epsilon_c$ location angles of each trainer with respect to the other trainer. These derived potentials are then utilized to control location indicating oscilloscopes in the same manner as in the first modification.

For a clearer understanding of the invention, reference may be had to the following detailed description thereof, taken in connection with the accompanying drawings in which.

Figure 6:
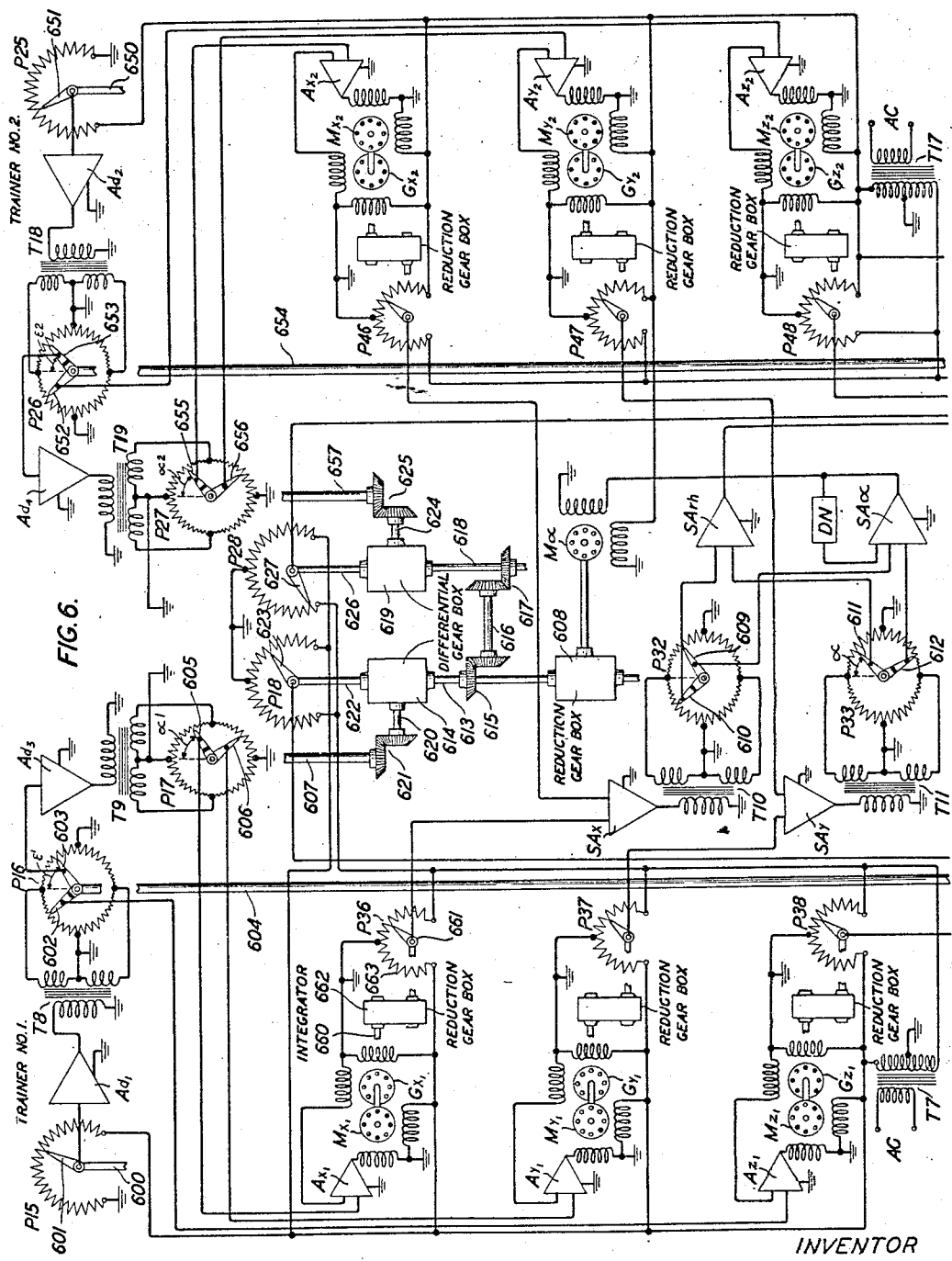
Figure 7:
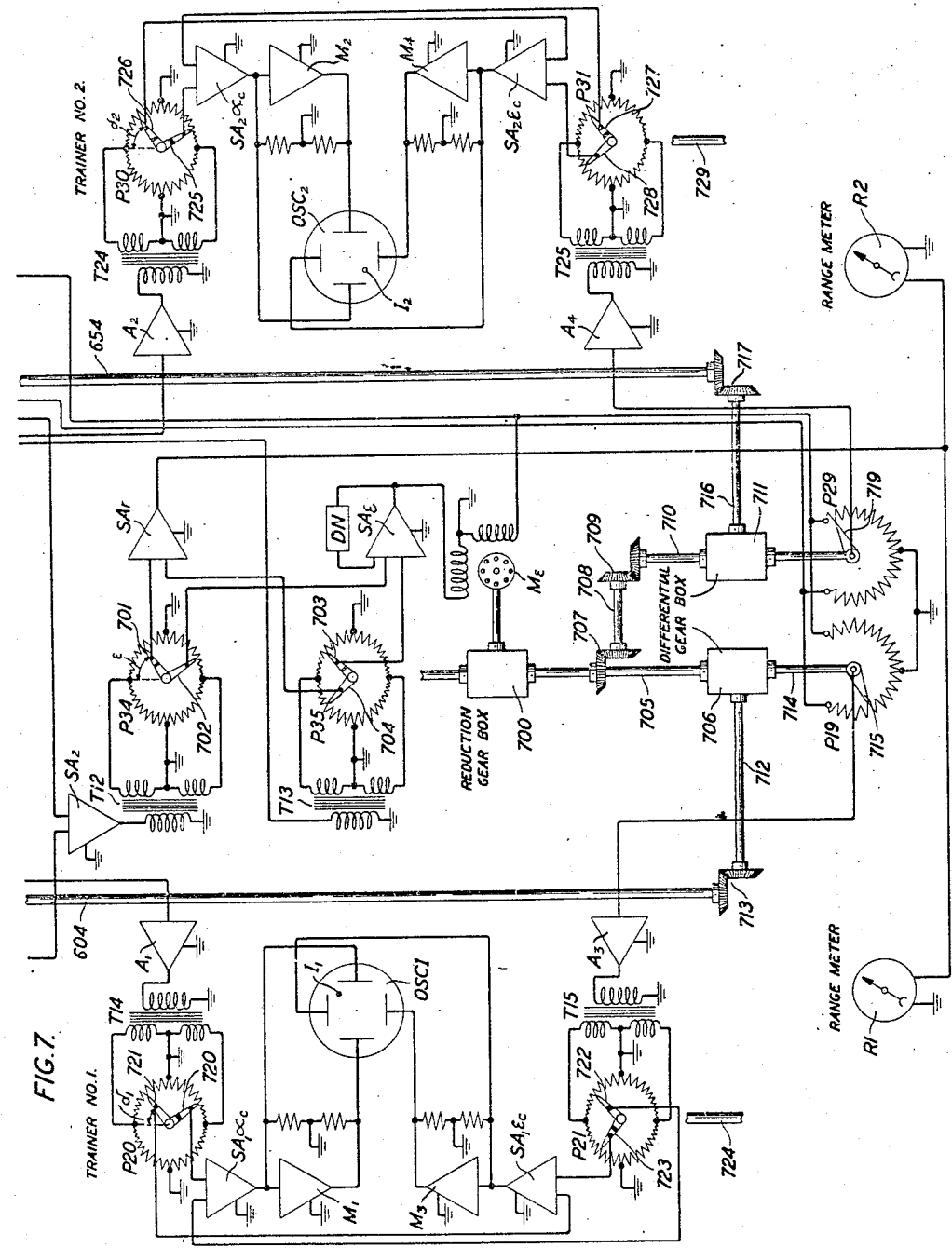
Figure 8:
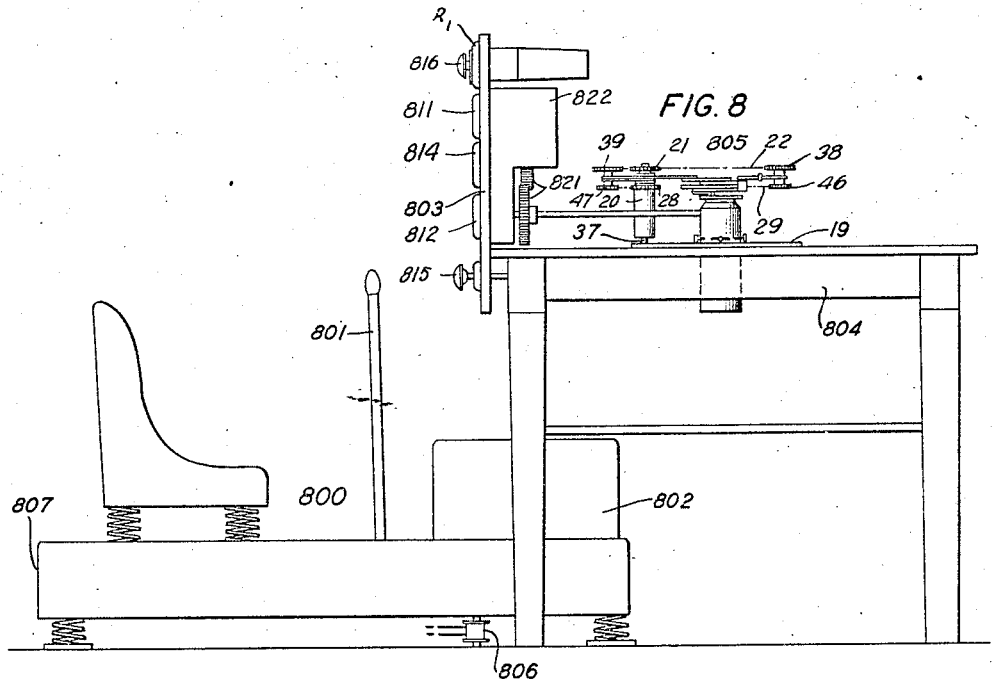

Figs. 6 and 7 taken together illustrate a modified form of the invention;

Fig. 8 is a side elevational view of the trainer; and

Figure 9:
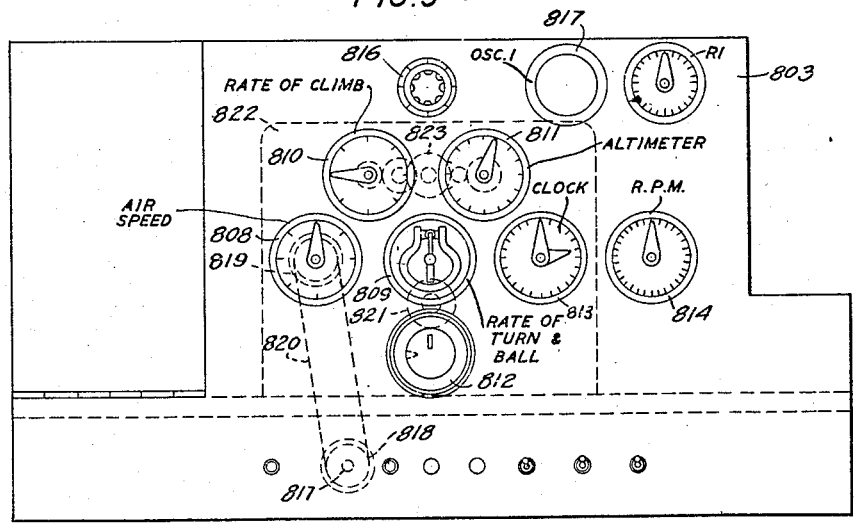

Fig. 9 shows the instrument panel of the trainer.

Figure 1:
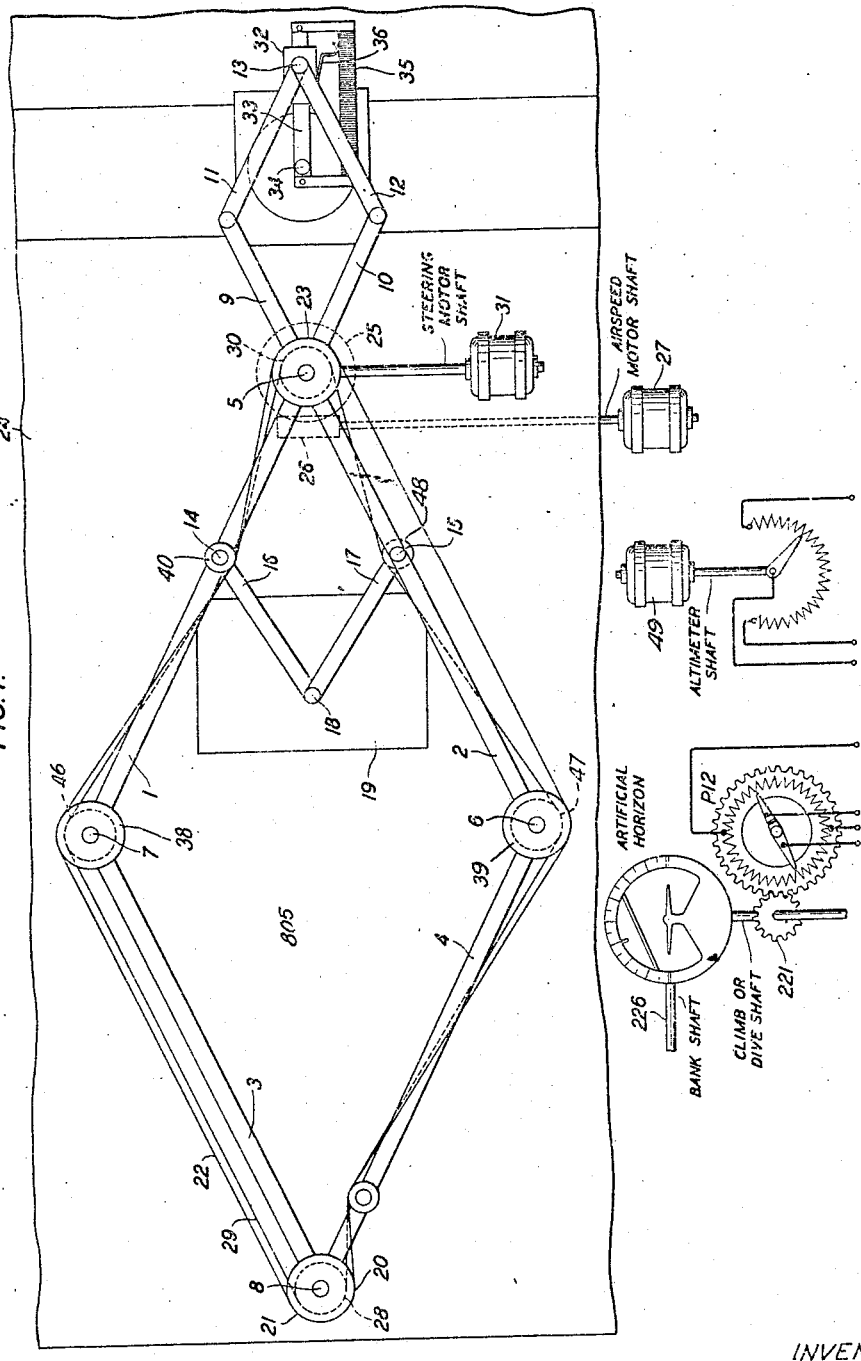
Fig. 1 shows the course charting apparatus of an aircraft trainer and certain of the instrument driving shafts of the trainer.

The invention is not limited in its application to any particular form of trainer as it may be used in any type having air speed, climb and turn indicators by the provision of apparatus for converting instrument operations into electrical potentials. For the purposes of illustration the invention has herein been shown as applied to a trainer of the type disclosed in my application Serial No. 398,590, filed June 13, 1941, and in my Patent No. 2,366,603, granted January 2, 1941. The trainer as disclosed schematically in Figs. 8 and 9 is provided with a pilot's station 800 having the usual control stick 801 and rudder pedals, hidden behind the apparatus cabinet 802, and an instrument panel 803. The instrument panel 803 shown more clearly in Fig. 9 is supported by the instructor's table 804. The panel carries the instruments corresponding to the usual instruments found in an actual airplane which consist of meter 808 depicting airspeed, the combination meter 809 depicting rate of turn of the aircraft and ball stability, the meter 810 depicting rate of climb, the meter 811 depicting altitude, the meter 812 depicting compass course, the clock 813, the tachometer 814, the control 815 which simulates the throttle control of the aircraft and the attenuator 816. The airspeed meter 808 is driven from the airspeed motor 27 through the shaft 817, pulleys 818 and 819 and belt 820. The gear train 821 is a part of the mechanical connection between the steering motor 31 which is housed within the casing 822 secured to the back of panel 803 and the driving head 20 of the course charting pantograph 805. The rate of climb meter 810 and altimeter 811 are driven through gear train 823 from the shaft of altimeter motor 48 also housed within the casing 822. The panel 803 in addition carries a target oscilloscope OSC1 and a range meter such as R1 to assist the student pilot in gunnery practice. A course charting apparatus 805 is supported on the top of the table and is responsive to the operation of the control stick. This trainer, as illustrated in Fig. 1, has a course charting device 805 of the pantograph type. The main pantograph comprises four arms 1, 2, 3 and 4 pivoted together at their junctions by pivots 5, 6, 7 and 8. The arms 1 and 2 have short extensions 9 and 10, to the ends of which pantograph arms 11 and 12 are pivoted, the latter arms being pivoted together at their junction by a pin 13. Also pivoted to the arms 1 and 2 by pivots 14 and 15 are two additional pantograph arms 16 and 17 pivoted together at 18 and carrying a scriber for marking the flight course on the terrain map or record sheet 19. At the junction point 8 is located a driving head 20 of the type fully disclosed in my application Serial No. 398,590, above referred to, having therein a tractor wheel 37, shown in Fig. 8, driven by the sprocket wheel 21 and through the sprocket chain 22 by the driving sprocket wheel 23 which is secured to the upper end of the pivot shaft 5. This shaft is mounted for rotation in a bearing secured to the table 24 and is driven by a worm gear 25 in turn driven by the worm 26 mounted on the shaft of the motor 27. To guide the chain 22, idler pulleys 38, 39 and 40 are rotatably mounted on the pivots 6, 7 and 14 of the pantograph.

The tractor wheel 37 is pivoted on a horizontally disposed axle which is rotatably supported in the lower end of the driving head 20, which head is rotatable about its vertical axis to orient the tractor wheel in response to the operation of the trainer control in the simulation of steering. To rotate the driving head the sprocket wheel 28 is attached thereto, as fully disclosed in my application Serial No. 398,590, hereinbefore referred to, which is driven by a sprocket chain 29, driven by a driving sprocket wheel 30 mounted to rotate freely with respect to the pivot shaft 5 and in turn driven through bevel gearing by the steering motor 31 of the trainer. To guide the chain 29, idler pulleys 47, 46, 48 and 49 are rotatably mounted on the pivots 6, 7, 14 and 15 of the pantograph. Thus through the operation of motor 27, the driving head 20 is advanced over the surface of the table 24 at a speed proportional to the indicated air speed and is oriented to determine the direction of its movement under the control of motor 31 and, because of the pantograph construction, the scriber carried at the pivot point 18 marks the course on the map or record 19. The pivot pin 13 also moves through a path which corresponds to and is parallel to the flight course traced by the scriber. For the purposes of the present invention the movement of the pin 13 is utilized to control potentiometers to determine potentials indicative of the degree and direction of the movement of the scriber with respect to the terrain map 19 and which potentials may be used to indicate the instant position of the scriber or the flight position of the trainer in its simulated flight with respect to a reference line assumed to be a line parallel to the lower edge of the map 19 as viewed in Fig. 1. To accomplish this the pivot pin 13 is engaged with a slider 32 which is supported on and slidable along the arm 33 secured to the shaft 34. Carried by the arm 33 is a potentiometer winding 35 with one edge of which the brush 36, insulatedly attached to the slider 32, engages. As the slider 32 moves toward and away from the shaft 34 more or less of the turns of the potentiometer winding 35 are made effective.

Figure 3:
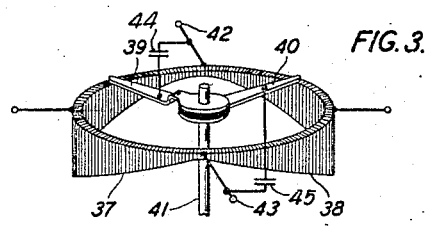
Fig. 3 shows the structure of the sine-cosine potentiometers illustrated schematically in Fig. 2.

Movement of the pin 13 about the shaft 5 also causes a rotational movement of the shaft 34. This rotational movement of shaft 34 is employed to control a potentiometer of the type disclosed in Fig. 3. This potentiometer has two windings 37 and 38 varying in resistance along their cards in accordance with sine wave functions. The insulation is removed from the wire at the upper straight edges of the cards and two brushes 39 and 40, insulatedly mounted on the shaft 41, are provided for engagement therewith. These brushes are positioned 90 degrees apart and with a potential applied across the terminals 42 and 43 at the junction points of the windings, the potential at the point of engagement of one brush with a winding will vary in accordance with the sine of the angle which that brush makes with the terminal position 42 and the potential at the point of engagement of the other brush with a winding will vary in accordance with the cosine of the angle.

Since the movement of the pantograph of the course charting apparatus is thus converted into an angular movement of shaft 34, and thus of the brushes of a sine-cosine potentiometer carried by such shaft, and into a linear movement of the brush 36 with respect to the potentiometer winding 35, these potentiometers may be employed to determine the instant location of the scriber with respect to the $x$ and $y$ coordinates of the terrain map and thus the position of the trainer in its simulated flight.

Figure 2:
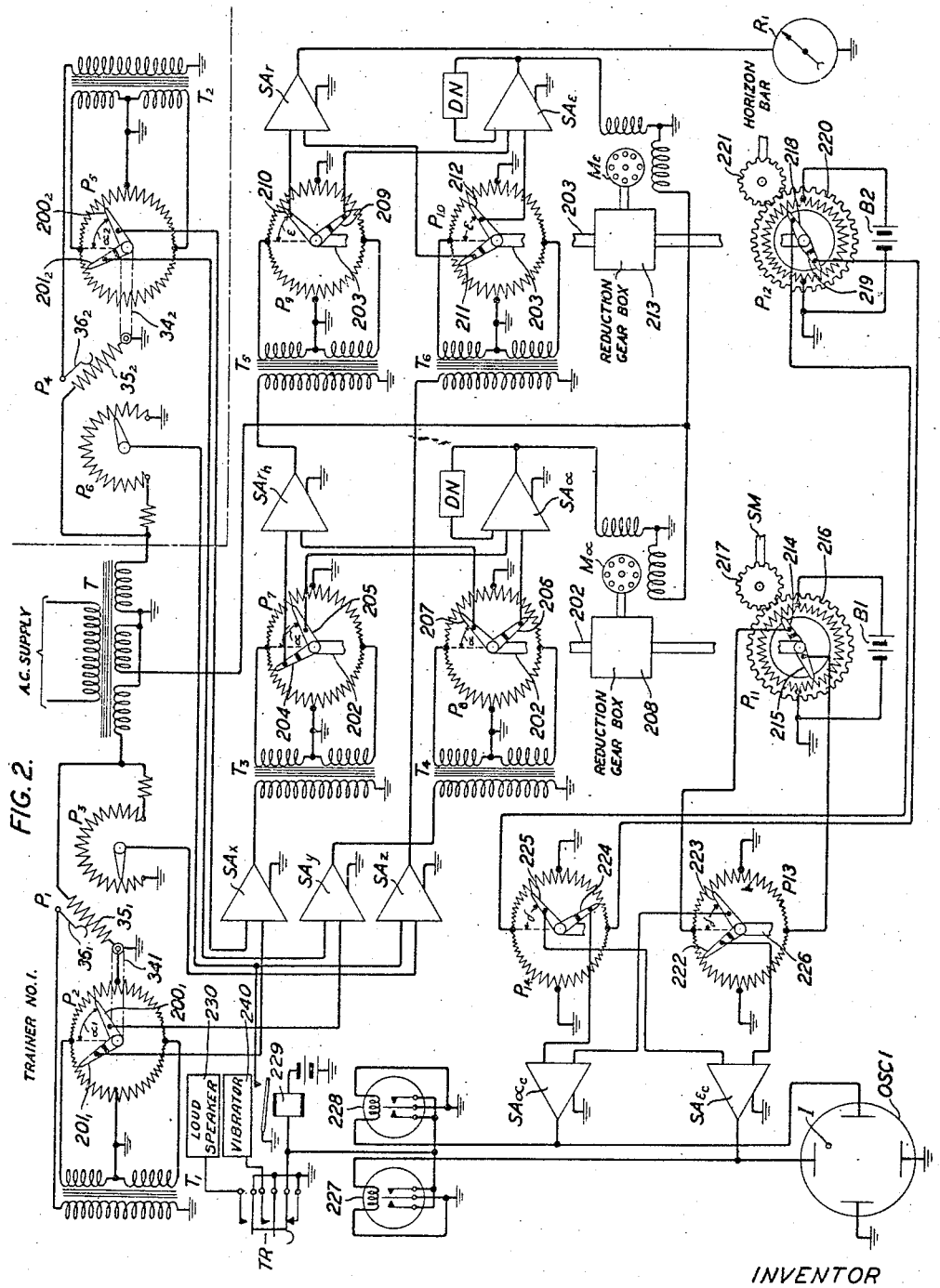
Fig. 2 is a circuit diagram illustrating the application of the invention to a trainer.

Referring now to Fig. 2, it will be assumed that two trainers are to be employed for the purpose of training aircraft personnel in the use of radio locating equipment and that the first trainer identified as trainer No. 1 is equipped with the training equipment disclosed in this figure with the exception of the apparatus disclosed within the dot-dash lines in the upper right portion of the figure and that this latter apparatus represents the course charting equipment of the second trainer No. 2 employed as a target or objective for the first trainer. The winding 35' of the potentiometer P1 of the first trainer is connected to the left secondary winding of the transformer T, the primary winding of which is connected to a source of alternating current. The brush $36_1$ of this potentiometer is connected to the primary winding of transformer T1 and the end terminals of the secondary winding of the latter transformer are connected to the junction points between the windings of the sine-cosine potentiometer P2. The mid-point of the secondary winding of transformer T1 and the mid-points of the windings of the potentiometer P2 are connected to ground. With the windings of transformer T1 wound for unity transformation, the potential $r_1$, derived by the position of brush $36_1$ of potentiometer P1 is applied to produce potentials of equal magnitude and opposite polarities at the junction points of the windings of potentiometer P2 for exciting such windings. It is to be noted that the position of the brush $36_1$ of potentiometer P1 and the angle $\alpha_1$ between the brush $200_1$ of potentiometer P2 and the $y$ axis of such potentiometer determine the flight position of the No. 1 trainer with respect to the horizontal plotting surface of the terrain map. To fully determine the flight position of the No. 1 trainer, a third potentiometer P3 is provided, the winding of which is energized by potential applied through the left secondary winding of transformer T and the brush of which is driven from the shaft which drives the altimeter of the trainer. This potentiometer therefore produces a potential at its brush which is proportional to the $z$ coordinate of the flight position of the trainer and may be expressed as $z_1$.

Since the potentiometer P1 produces a potential $r_1$ proportional to the radial distance of the slider brush $36_1$ from the shaft $34_1$ and this potential is fractionated by the sine-cosine potentiometer P2 in accordance with the angular position $\alpha_1$ of the arm carrying the potentiometer P1, the potentials resulting at the points of engagement of the brushes $200_1$ and $201_1$ of the potentiometer P2 with the windings thereof are proportional to the $x$ and $y$ coordinates of the flight position of the No. 1 trainer and may be expressed as $$-x_1 = -r_1 \text{ sine } \alpha_1$$
$$-y_1 = -r_1 \text{ cosine } \alpha_1 \quad (1)$$

Similarly with respect to the No. 2 trainer, assumed to be conducting a simulated flight over the same terrain and serving as a target or objective for the first trainer, the potentiometer P4 thereof supplied with potential from the right secondary winding of transformer T then produces a potential $r_2$ proportional to the radial distance of the slider brush $36_2$ from the shaft $34_2$ and this potential is fractionated by the sine-cosine potentiometer P5 in accordance with the angular position $\alpha_2$ of the arm carrying the potentiometer P4, resulting in the production of potentials at the points of engagement of the brushes $200_2$ and $201_2$ of the potentiometer P5 with the windings thereof which are proportional to the $x$ and $y$ coordinates of the flight position of such No. 2 trainer and which potentials may be expressed as $$x_2 = r_2 \text{ sine } \alpha_2$$
$$y_2 = r_2 \text{ cosine } \alpha_2 \quad (2)$$

To fully determine the flight position of the No. 2 trainer, the potentiometer P6 is provided therein, the winding of which is energized by potential applied through the right secondary winding of transformer T and the brush of which is driven from the shaft which drives the altimeter of that trainer. This potentiometer therefore produces a potential at its brush which is proportional to the $z$ coordinate of the flight position and may be expressed as $z_2$.

It will be noted that the left secondary winding of transformer T which supplies potential to the potentiometer P2 is connected reversely to the right secondary winding of transformer T which supplies potential to the potentiometer P5 so that the instant value of $r_2$ is opposite in phase to that of $r_1$. Since these secondary windings of transformer T also supply potentials to the potentiometers P3 and P6, the instant value of potential $z_2$ is opposite to that of $z_1$. Hence the resultant potentials from potentiometers P2 and P5 may be impressed on the summing amplifiers SA$x$ and SA$y$ and the resultant potentials from the potentiometers P3 and P6 may be impressed on the summing amplifier SA$z$ to calculate the difference between the flight position of the two trainers in their simulated flights according to the equation:

$$x_2 - x_1 = x$$
$$y_2 - y_1 = y \quad (3)$$
$$z_2 - z_1 = z$$

Figure 5:
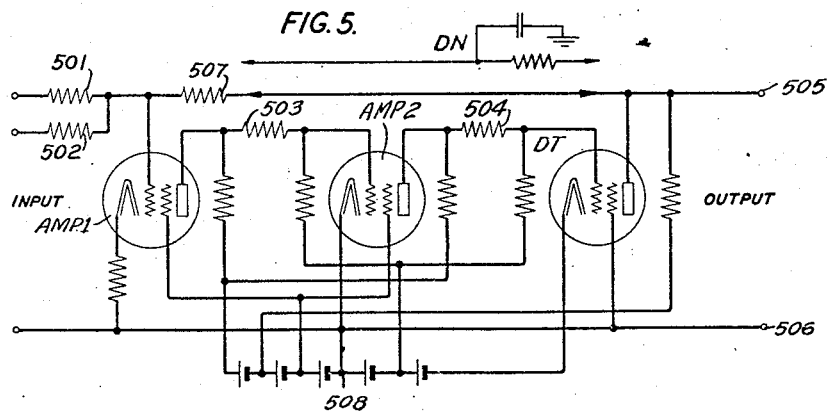
Fig. 5 shows one form of summing amplifier circuit which may be employed in the circuit of Fig. 2.

The summing amplifiers employed, such for example as the amplifiers SA$x$, SA$y$ and SA$z$, may be of the type disclosed in full lines in Fig. 5. This amplifier comprises a first voltage amplifier tube AMP1 upon the control grid of which signal potentials are applied through parallelly connected resistors such as 501 and 502. The amplified output from this tube is applied through the coupling resistor 503 upon the control grid of a second amplifier tube AMP2, the amplified output from which is applied to the control grid of the detector tube DT through the coupling resistor 504. The output circuit of the detector tube is connected to the output terminals 505 and 506. The amplifier is stabilized by a negative feedback circuit from the anode of tube DT through resistor 507 to the control grid of the amplifier tube AMP1. The filaments of the tubes are heated from a filament current supply (not shown) and control grid, biasing potentials, screen grid potentials and anode potentials are applied to the tubes from appropriate taps of the battery 508.

It is important that proper phase relations be maintained throughout the circuit. Should phase shifts occur, for example, in the potentiometer windings due to admittances to ground, these may be adequately corrected in most instances by condensers 44 and 45 connected between the sliders or brushes and the high voltage end of any potentiometer as shown for example in Fig. 3.

For the purpose of indicating the flight position of the target or objective with respect to the line of simulated flight of the No. 1 trainer and for giving the trainee an indication simulating the distance or slant range between the flight positions of the two trainers, oscilloscope OSC1 and an indicator R1 are provided in the No. 1 trainer. The oscilloscope OSC1 is arranged to produce a spot of light on its screen simulating the target or objective position which is dependent upon the azimuth and elevation angles between the flight position of the No. 1 trainer and the flight position of the target or objective, in the case assumed, the No. 2 trainer. The range indicator R1 is also dependent on the air line distance or range to the target or objective. Hence for operating the oscilloscope OSC1 and indicator R1 it is desirable to express the relative position of the target or object with respect to the No. 1 trainer in polar coordinates, $\alpha$ for the azimuth angle, $\epsilon$ for the elevation angle and $r$ for the slant range rather than in the Cartesian coordinates $x$, $y$ and $z$ produced as hereinbefore described by the summing amplifiers.

Figure 4:
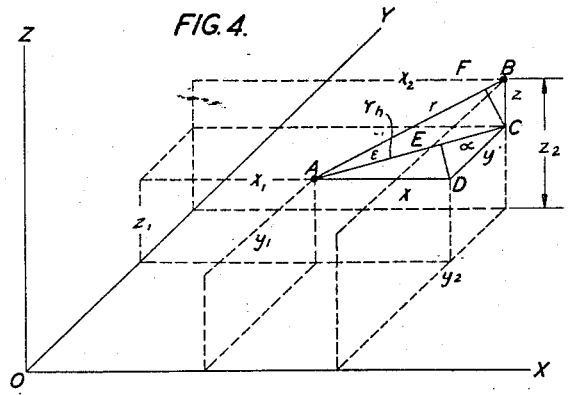
Fig. 4 is a diagram illustrating the resolution of the Cartesian coordinates of a trainer flight position and a target position into the polar coordinates of a flight path from the trainer flight position to the target position and the distance or range between the trainer flight position and the target position.

Referring now to Fig. 4, it will be assumed that at any given instant, the flight position of the No. 1 trainer may be indicated at the point A which is located at the perpendicular distance $x_1$ from the plane including the lines OY and OZ, at the perpendicular distance $y_1$ from the plane including the lines OX and OZ and at the perpendicular distance $z_1$ from the plane including the lines OX and OY. Lines $x_1$, $y_1$ and $z_1$ are therefore the Cartesian coordinates of the position of the point A. It will further be assumed that the flight position of the No. 2 trainer will be indicated at the point B which is located at the perpendicular distance $x_2$ from the plane including the lines OY and OZ, at the perpendicular distance $y_2$ from the plane including the lines OX and OZ and at the perpendicular distance $z_2$ from the plane including the lines OX and OY. Lines $x_2$, $y_2$ and $z_2$ are therefore the Cartesian coordinates of the position of the point B.

If now a plane be passed through the point A, parallel to the plane of lines OX and OY and the line BC drawn from the point B perpendicular to such plane, it will be seen that the line BC represents $z_2-z_1$ and may be designated $z$. If now the line $x_1$ is extended in this plane to the point D where the line drawn in the plane from the point C and parallel to the plane through lines OY and OZ intersects the extension of line $x_1$, then AD will represent $x_2-x_1$ and may be designated $x$ and CD will represent $y_2-y_1$ and may be designated $y$. Thus lines AD, CD and BC represent the Cartesian coordinates $x$, $y$ and $z$ of the flight path or slant range between the two flight positions A and B which coordinates are represented by the output potentials of the summing amplifiers SA$x$, SA$y$ and SA$z$. A line drawn in the horizontal plane of the point A to the point C represents the horizontal range $r_h$ between the points A and C and the line connecting the points A and B represents the slant range $r$. The horizontal angle ACD defines the azimuth angle $\alpha$ between the $y$ coordinate CD and the horizontal range AC or $r_h$ and the vertical angle BAC defines the elevation angle $\epsilon$ between the horizontal range AC or $r_h$ and the slant range AB or $r$.

If now a line be drawn in the horizontal plane through the point A from the point D and perpendicular to the line AC, then the angle CDE is equal to 90 degrees $-\alpha$, and angle EDA is equal to $\alpha$. The following equations may now be evolved:

$$ED = DC \sin \alpha = y \sin \alpha$$
$$ED = AD \cos \alpha = x \cos \alpha$$
$$y \sin \alpha = x \cos \alpha$$
$$x \cos \alpha - y \sin \alpha = 0 \qquad (4)$$

$$AE = x \sin \alpha$$
$$EC = y \cos \alpha$$
$$x \sin \alpha + y \cos \alpha = AE + EC = AC$$
$$x \sin \alpha + y \cos \alpha = r_h \qquad (5)$$

If a line also be drawn in the vertical plane through the line AC and BC from the point C perpendicular to the line AB, then the angle ACF is equal to 90 degrees $-\epsilon$; and angle BCF is equal to $\epsilon$. The following equations may now be evolved:

$$FC = AC \sin \epsilon = r_h \sin \epsilon$$
$$FC = BC \cos \epsilon = z \cos \epsilon$$
$$r_h \sin \epsilon = z \cos \epsilon$$
$$r_h \sin \epsilon - z \cos \epsilon = 0 \qquad (6)$$

$$AF = r_h \cos \epsilon$$
$$FB = z \sin \epsilon$$
$$z \sin \epsilon + r_h \cos \epsilon = AF + FB = AB$$
$$z \sin \epsilon + r_h \cos \epsilon = r \qquad (7)$$

To secure solutions for Equations 4 and 5, a pair of sine-cosine potentiometers P7 and P8 is provided, each with its brushes secured to but insulated from a shaft 202. The diametrically opposite junction points between the windings of the potentiometer P7 are connected to the end terminals of the secondary winding of transformer T3, the primary winding of which is connected across the output terminals of the summing amplifier SA$x$. The mid-point of the secondary winding of the transformer T3 and the mid-points of the windings of potentiometer P7 are connected to ground. With the windings of transformer T3 wound for unity transformation, the output potential from the amplifier, SA$x$, which is proportional to the $x$ coordinate, is applied to produce potentials of equal magnitude and opposite polarity at the junction points of the windings of potentiometer P7. The diametrically opposite junction points between the windings of the potentiometer P8 are connected to the end terminals of the secondary windings of transformer T4, the primary winding of which is connected across the output terminals of the summing amplifier SA$y$. The mid-point of the secondary winding of transformer T4 and the mid-points of the windings of potentiometer P8 are connected to ground. With the windings of transformer T4 wound for unity transformation, the output potential from the amplifier SA$y$, which is proportional to the $y$ coordinate, is applied to produce potentials of equal magnitude and opposite polarities at the junction points of the windings of potentiometer P8.

The brushes 205 and 207 of potentiometers P7 and P8 make at any instant an angle $\alpha$ with the vertical diameter or $y$ axis of the windings of such potentiometers and the brushes 204 and 206 being positioned in quadrature to the brushes 205 and 207 make at any instant the angle 90 degrees $\pm \alpha$ with the vertical diameter. Therefore the potentials at the points of engagement of the brushes 204 and 205 with the windings of potentiometer P7 are proportional to $\pm x$ sine $\alpha$ and $\pm x$ cosine $\alpha$, respectively. Since the sine brush 206 of the potentiometer P8 is rotated through an angle of 180 degrees with respect to the sine brush 204 of potentiometer P7, the sine brush 206 leads the cosine brush 207, and therefore the potentials at the points of engagement of the brushes 206 and 207 with the windings of potentiometer P8 are proportional to $\pm y$ cosine $\alpha$ and $\mp y$ sine $\alpha$. Hence the potential $y$ sine $\alpha$ is opposite in phase to the potential $x$ cosine $\alpha$. Moreover, the potential $y$ cosine $\alpha$ is always equal in polarity to the potential $x$ sine $\alpha$.

If now the sine brush 206 of potentiometer P8 and the cosine brush 205 of potentiometer P7 are connected to the input side of summing amplifier SA$\alpha$, this amplifier will add the instant potentials on such brushes, $\pm x$ cosine $\alpha$ and $\mp y$ sine $\alpha$, and will have an output potential equal to zero which will satisfy Equation 4 when the brushes have been set to a position equal to the correct value of the azimuth angle $\alpha$. Also if the sine brush 204 of potentiometer P7 and the cosine brush 207 of potentiometer P8 are connected to the input side of summing amplifier SA$r_h$, this amplifier will add the potentials on said brushes $\pm x$ sine $\alpha$ and $\pm y$ cosine $\alpha$, and will have an output potential which will satisfy Equation 5 for the potential having a value proportional to the horizontal range $r_h$ when the brushes have been set to a position corresponding to the value of the correct azimuth angle $\alpha$.

To secure the correct value for the angle $\alpha$, it is therefore only necessary to rotate the shaft 202 until such a value of angle $\alpha$ is attained that Equation 4 becomes satisfied. This is accomplished by rotating shaft 202 by a two-phase servo-motor M$\alpha$ whose armature is geared to the shaft 202 through reduction gear box 208. One phase winding of the motor is energized by potential impressed upon it from the middle secondary winding of transformer T and the other phase winding is energized by potential impressed upon it from the output side of the summing amplifier SA$\alpha$. So long as the output potential of this amplifier is other than zero, the motor M$\alpha$ will rotate in one or the other direction and drive the shaft 202 to change the value of the angle $\alpha$ until such a value is attained as to satisfy Equation 4 at which time the output potential of amplifier SA$\alpha$ will become zero and the motor M$\alpha$ will stop. To reduce the tendency of motor M$\alpha$ to hunt as the output potential of amplifier SA$\alpha$ approaches zero and the motor slows down, the differentiating network DN shown in Fig. 5 is substituted for the feedback circuit extending from the anode of tube DT to resistor 507.

To secure solutions for Equations 6 and 7 a pair of sine and cosine potentiometers P9 and P10 is provided each with their brushes secured to but insulated from a shaft 203. The diametrically opposite junction points between the windings of potentiometer P9 are connected to the end terminals of the secondary winding of transformer T5, the primary winding of which is connected across the output terminals of the summing amplifier SA$r_h$. The mid-point of the secondary winding of the transformer T5 and the mid-points of the windings of potentiometer P9 are connected to ground. With the windings of transformer T5 wound for unity transformation, the output potential from the amplifier SA$r_h$, which is proportional to the horizontal range $r_h$, is applied to produce potentials of equal magnitude and opposite polarity at the junction points of the windings of potentiometer P9. The diametrically opposite junction points between the windings of potentiometer P10 are connected to the end terminals of the secondary winding of transformer T6, the primary winding of which is connected across the output terminals of the summing amplifier SA$z$. The mid-point of the secondary winding of transformer T6 and the mid-points of the windings of potentiometer P10 are connected to ground. With the windings of transformer T6 wound for unity transformation, the output potential from the amplifier SA$z$, which is proportional to the $z$ coordinate, is applied to produce potentials of equal magnitude and opposite polarity at the junction points of the windings of potentiometer P10.

The brushes 210 and 212 of potentiometers P9 and P10 make at any instant an angle $\epsilon$ with the vertical diameter or $y$ axis of the windings of such potentiometers and the brushes 209 and 211 being positioned in quadrature to the brushes 210 and 212, make at any instant an angle of 90 degrees $\pm \epsilon$ with the vertical diameter and therefore the potentials at the points of engagement of the brushes 211 and 212 with the windings of potentiometer P10 are proportional to $\pm z$ sine $\epsilon$ and $\pm z$ cosine $\epsilon$ respectively. Since the sine brush 209 of potentiometer P9 is rotated through an angle of 180 degrees with respect to the sine brush 211 of potentiometer P10, the sine brush 209 leads the cosine brush 210 and therefore the potentials at the points of engagement of the brushes 209 and 210 with the windings of potentiometer P9, are proportional to $\pm r_h$ cosine $\epsilon$ and $\pm r_h$ sine $\epsilon$.

If now the sine brush 209 of potentiometer P9 and the cosine brush 212 of potentiometer P10 are connected to the input side of summing amplifier SA$\epsilon$ this amplifier will add the instant potentials on said brushes, $\pm r_h$ sine $\epsilon$ and $\pm z$ cosine $\epsilon$ and will have an output potential equal to zero which will satisfy Equation 6 when the brushes have been set to a position equal to the correct value of the elevation angle $\epsilon$. Also if the sine brush 211 of potentiometer P10 and the cosine brush 210 of potentiometer P9 are connected to the input side of summing amplifier SA$r$, this amplifier will add the instant potentials on said brushes, $\pm z$ sine $\epsilon$ and $\pm r_h$ cosine $\epsilon$, and will have an output potential which will satisfy Equation 7 for the potential having a value proportional to the slant range $r$ when the brushes have been set to a position equal to the value of the elevation angle $\epsilon$.

To secure the correct value of the angle $\epsilon$, it is therefore only necessary to rotate the shaft 203 until the angle $\epsilon$ attains such a value that Equation 6 becomes satisfied. This is accomplished by rotating shaft 203 by a two-phase servomotor M$\epsilon$ whose armature is geared to the shaft 203 through the reduction gear box 213. One phase winding of the motor M$\epsilon$ is energized by potential impressed upon it from the middle secondary winding of transformer T and the other phase winding is energized by potential impressed upon it from the output side of the summing amplifier SA$\epsilon$. So long as the output potential from this amplifier is other than zero, the motor M$\epsilon$ will rotate in one or the other direction and drive the shaft 203 to change the value of the angle $\epsilon$ until such a value is attained as to satisfy Equation 6 at which time the output potential of amplifier $SA_\epsilon$ will become zero and the motor $M_\epsilon$ will stop. To reduce the tendency of motor $M_\epsilon$ to hunt, a differentiating network DN is provided.

The range indicator RI is of the voltmeter type having its scale calibrated in terms of range units. Its pointer is movable over the scale in accordance with the range potential output $r$ of the summing amplifier SAr impressed across the voltmeter coil. It is to be understood, however, that an oscilloscope might also be used as a range indicator.

The shaft 202 carries the pair of brushes 214 and 215 of a potentiometer P11 which brushes are insulatedly positioned on the shaft 180 degrees apart so that the brush 214 makes the same $\alpha$ angle with the vertical diameter of the potentiometer as the brushes 205 and 207. These brushes engage with the two windings of the potentiometer which are mounted for rotation about the axis of the shaft 202. For this purpose the windings may be secured to a ring gear 216 which may be rotated by the pinion gear 217. The two windings form a continuous circular winding, the junction points between which being connected to the terminals of a battery B1, the negative terminal of which is connected to ground. The pinion gear 217 may be rotated in response to the steering control of the trainer. The potentiometer brushes 214 and 215 being rotated by the shaft 202, assume a position indicative of the instant value of the azimuth angle $\alpha$ of the location of the No. 1 trainer with respect to the target and the windings of the potentiometer P11 assume at any instant a position indicative of the heading of the flight path of the No. 1 trainer. Therefore the potentials from the battery B1 impressed upon the brushes 214 and 215 are of equal magnitude but of opposite polarity and are equal to the potentials $+(\alpha\pm\beta)$ and $-(\alpha\pm\beta)$, it being assumed that the potential $\alpha$ is the potential incident to the positioning of the brushes to measure the angle $\alpha$ and that the correction potential $\beta$ is the potential incident to the positioning of the windings of the potentiometer P11 to measure the incident flight bearing angle $\beta$. As an alternative structure the winding of the potentiometer P11 may be made stationary and the required correction introduced by a differential gear box introduced between the shaft 202 and the brush shaft of the potentiometer with one input gear driven by shaft 202, the other input gear driven by the steering motor and the output shaft connected to the brush shaft of the potentiometer.

The shaft 203 carries a pair of brushes 218 and 219 of a potentiometer P12 insulatedly positioned on the shaft 180 degrees apart so that the brush 218 makes the same $\epsilon$ angle with the vertical diameter of the potentiometer as the brushes 210 and 212. These brushes engage with the windings of the potentiometer which are mounted for rotation about the axis of the shaft 203. For this purpose the windings may be secured to a ring gear 220 which may be rotated by the pinion gear 221. The two windings form a continuous circular winding, the junction points between which are connected to the opposite terminals of a battery B2, the negative terminal of which is connected to ground. The pinion gear 221 may, as disclosed in Fig. 1, be rotated by the shaft which raises and lowers the horizon bar of the artificial horizon instrument of the trainer in response to the control of the trainer to simulate diving or climbing or the pinion gear 221 may be positioned by any other means responsive to the inclination of the line of simulated flight from the horizontal. The potentiometer brushes 218 and 219 being rotated by the shaft 203, assume a position indicative of the instant value of the elevation angle $\epsilon$ of the location of the No. 1 trainer with respect to the target, and the windings of the potentiometer P12 assume at any instant a position indicative of the instant diving or climbing direction of the flight path. Therefore the potentials impressed from the battery B2 upon the brushes 218 and 219 are of equal magnitude but of opposite polarity and are equal to the potentials $+(\epsilon\pm\omega)$ and $-(\epsilon\pm\omega)$, being assumed that potential $\epsilon$ is the potential incident to the positioning of the brushes to measure the angle $\epsilon$ and that the correction potential $\omega$ is the potential incident to the positioning of the windings of the potentiometer P12 to measure the instant angle $\omega$ of climb or dive. As an alternative construction the differential gearing previously described could be used to drive the brush shaft of the potentiometer P12.

The potentials $\alpha\pm\beta$ and $\epsilon\pm\omega$ could be applied directly across the horizontal and vertical plates of the oscilloscope OSC1 to control the position of the image I on the screen, indicating the location of the target or objective with respect to the No. 1 trainer, but it is also desirable to simulate the change in the image position as affected by the control of the trainer to simulate rolls or banks. This is accomplished by connecting the brushes of potentiometer P11 to the diametrically positioned junction points between the windings of the sine and cosine potentiometer P13 to produce potentials of equal magnitude and opposite polarity at such junction points equal to $\pm(\alpha\pm\beta)$. The mid-points of the windings of potentiometer P13 are connected to ground. Similarly the brushes of potentiometer P12 are connected to the diametrically positioned junction points between the windings of the sine-cosine potentiometer P14 to produce potentials of equal magnitude and opposite polarity at such junction points equal to $\pm(\epsilon\pm\omega)$. The midpoints of the windings of potentiometer P14 are connected to ground. The sine and cosine brushes 222 and 223 of potentiometer P13 and the sine and cosine brushes 224 and 225 of potentiometer P14 are insulatedly mounted on the same shaft 226 which shaft controls the artificial horizon instrument of the trainer to indicate a simulated roll or bank or the shaft 226 may be actuated by any other means responsive to simulated roll or bank.

The sine brush 224 of potentiometer P14 and the cosine brush 223 of potentiometer P13 are connected to the input side of a summing amplifier $SA\alpha c$, the output side of which is bridged across the horizontal plates of the target location oscilloscope OSC1. The sine brush 222 of potentiometer P13 and the cosine brush 225 of potentiometer P14 are connected to the input side of a summing amplifier $SA\epsilon c$, the output side of which is bridged across the vertical plates of the oscilloscope OSC1. If at any instant it be assumed that the angle of roll with respect to the vertical axis of the potentiometers may be represented by $\delta$ then summing amplifier $SA\alpha c$ will add the instant potentials on brushes 224 and 223 $\pm(\epsilon\pm\omega)$ sine $\delta$ and $\pm(\alpha\pm\beta)$ cosine $\delta$ and summing amplifier $SA\epsilon c$ will add the instant potentials on brushes 222 and 225 $\pm(\alpha\pm\beta)$ sine $\delta$ and $\pm(\epsilon\pm\omega)$ cosine $\delta$.

If there is no roll and consequently the angle $\delta$ is zero, then the potential $\pm(\epsilon\pm\omega)$ sine $\delta$ on brush 224 becomes zero and the potential $\pm(\alpha\pm\beta)$ cosine $\delta$ on brush 223 becomes $\pm(\alpha\pm\beta)$ and consequently the output potential from the summing amplifier SA$\alpha c$ becomes $\pm(\alpha\pm\beta)$. Also the potential $\pm(\alpha\pm\beta)$ sine $\delta$ on brush 222 becomes zero and the potential $\pm(\epsilon\pm\omega)$ cosine $\delta$ on brush 225 becomes $\pm(\epsilon\pm\omega)$ and consequently the output potential from the summing amplifier SA$\epsilon c$ becomes $\pm(\epsilon\pm\omega)$. The effect of increasing the angle $\delta$ from zero in either the positive or negative direction is to cause such a change on the output potentials of the summing amplifiers SA$\alpha c$ and SA$\epsilon c$ as to make the target image rotate in a circular path about the axis of the oscilloscope screen.

At any instant, therefore, the image spot I on the screen of location oscilloscope OSC1 indicates the general bearing of the target or objective with respect to the location of the No. 1 trainer. If now the trainee operates the steering controls of the trainer thereby causing the rotation of the winding of potentiometer P11 until the angle $\beta$ becomes equal to the angle $\alpha$ at which time the heading of the trainer will be in the direction of the horizontal range $r_h$ as indicated in Fig. 4, then the output potentials from the potentiometer P11 will become zero and consequently the potential applied from the amplifier SA$\alpha c$ to the horizontal plates of the oscilloscope OSC1 will become zero and the image I will move into a position along the vertical cross-hair on the screen of such oscilloscope. If the trainee also operates the elevator controls of the trainer and thereby causes the rotation of the windings of potentiometer P12 until the angle $\omega$ becomes equal to the angle $\epsilon$, at which time the heading of the trainer will be in the direction of the slant range $r$ as indicated in Fig. 4, then the output potentials from the potentiometer P12 will become zero and consequently the potential applied from the amplifier SA$\epsilon c$ to the vertical plates of the oscilloscope OSC1 will become zero and the image I will move into a position at the intersection of the cross-hairs of the oscilloscope screen. In an aircraft equipped with radio location equipment, this would be the correct instant to fire the fixed gun carried by the aircraft since at only this instant would the gun be trained upon the target whose image appears on the screen of the radio locator.

To simulate the effect of firing the gun under this condition two relays 227 and 228 of the voltmeter type are provided, relay 227 having its winding bridged across the vertical plates of the oscilloscope OSC1 and energizable by the potential applied across such plates from the amplifier SA$\epsilon c$ and relay 228 having its winding bridged across the horizontal plates of the oscilloscope and energizable by the potential applied across such plates from the amplifier SA$\alpha c$. The vanes or armatures of these relays are connected to ground and the front and back contacts of both relays are connected together and to the winding of a third relay 229. Relays 227 and 228 are both so adjusted that their vanes will be positioned mid-way between their associated front and back contacts and out of engagement therewith only when the output potentials from the amplifiers are such as to position the image spot I at the center of the screen of the oscilloscope or of zero values. Should it be desired to cause the vanes of both relays to be out of engagement with their associated contacts at some point other than the center, for example by an amount representing "gun lead," the vanes may be mechanically biased as by a biasing spring or electrically biased as by the addition of a biasing winding. Relay 229 is normally held operated over the normally closed contacts of key TR and over a front or back contact of one or both of the voltmeter relays 227 and 228. If however, key TR which corresponds to a gun release trigger, is depressed at the instant the target image I is at the center of the screen of the oscilloscope, the relay 229 will have no holding circuit and will release to apply a short-circuiting ground to the path over which the $z_2$ input potential is received by the summing amplifier SA$z$ from the altimeter potentiometer P5 of the No. 2 or target trainer.

The removal of the $Z_2$ input potential from the SA$z$ summing amplifier will so change the output potential of the amplifier SA$z$ that the servo-motor M$\epsilon$ will be operated to determine a new value for the angle $\epsilon$ which will again satisfy Equation 6. Potentiometer P12 is thereupon operated to produce new potentials at its brushes of such a value as to depress the position of the image I of the target on the screen of oscilloscope OSC1 to indicate the traget as having been hit and falling. At the same time, the operation of the servo-motor M$\epsilon$ changes the value of the output potential of the amplifier SA$r$ to control the range indicator R1 to indicate a changed range. The rate at which the target appears to fall is determined by the follow-up speed of the servo-motor M$\epsilon$. This may be reduced by inserting an attenuating pad in the motor circuit by contacts closed when relay 229 operates. A contact may also be added to relay 229 to break the power circuit to the trainer No. 2 when a hit has been secured by the No. 1 trainee to represent the annihilation of the target.

Obviously a second oscilloscope and range indicator similar to OSC1 and R1 may be located in the No. 2 trainer together with another set of potentiometers P11, P12, P13 and P14 to operate such oscilloscopes. These potentiometers as in the No. 1 trainer may be driven in accordance with the direction of steering and the bank and pitch of the artificial horizon instrument of the No. 2 trainer. In this case the brushes of the P11 and P12 potentiometers of the No. 2 trainer should be displaced 180 degrees from those of the No. 1 trainer. Relays similar to relays 227, 228 and 229 and a key similar to key TR may be provided in the No. 2 trainer to enable its trainee to simulate the securing of a hit on the No. 1 trainer.

If desired, sound and vibration effects corresponding to those of gun-fire may be introduced through the operation of the trigger release key TR and a timing circuit could be added limiting the length of time the gun may be fired simulating the expenditure of ammunition. The sound effects circuit is represented by rectangle 238 and the vibration effects circuit is represented by the rectangle 240 shown in Fig. 2 and are controlled by the contacts of key TR. The vibration circuit would include the vibration magnet 806 diagrammatically illustrated in Fig. 8.

In lieu of the equipment disclosed to simulate two airplanes in flight, fixed voltages may be introduced at the inputs of the amplifiers SA$x$, SA$y$ and SA$z$, replacing the $x_2$, $y_2$ and $z_2$ potentials from the second trainer to thus simulate stationary objects in the air or on the ground, or the potentials $x_2$ and $y_2$ may be varied with the potential $z_2$ made equal to zero to simulate a ship at sea or an object moving on the ground.

Referring now to Figs. 6 and 7 which disclose a further modification of the invention, it will be assumed that two trainers are to be employed for training aircraft personnel and that the first trainer, identified as trainer No. 1, is provided with the control equipment, location oscilloscope OSC1, range meter R1 and potentiometers P18 and P19 disclosed in the left portion of these figures, that the second trainer, identified as trainer No. 2, is provided with the control equipment, location oscilloscope OSC2, range meter R2 and potentiometers P28 and P29 disclosed in the right portion of these figures and that the apparatus disclosed in the central portion of these figures is equipment common to both trainers. The brush shaft 600 of potentiometer P15 is driven by the motor of the No. 1 trainer which drives the air speed indicator thereof, or it may be operated by any other means responsive to the simulated air speed, and the winding of such potentiometer is energized by alternating current impressed thereupon from the source AC through the windings of power transformer T7. In response therefore to changes in the air speed of the simulated flight, a potential is applied over the brush 601 of potentiometer P15 to the input circuit of the decoupling amplifier $Ad_1$. The output potential $As_1$ from the amplifier $Ad_1$ is impressed upon the primary winding of transformer T8, the end terminals of the secondary winding of which are connected to the junction points between the windings of the sine-cosine potentiometer P16.

The mid-point of the secondary winding of transformer T8 and the mid-points of the windings of the potentiometer P16 are connected to ground. With the windings of this transformer wound for unity transformation, the potential derived by the position of brush 601 is applied to produce potentials of equal magnitude and opposite polarities at the junction points of the windings of potentiometer P16 for exciting such windings. The brushes 602 and 603 of potentiometer P16 are mounted on shaft 604 which may be driven by the motor on the trainer which raises or lowers the horizon bar of the artificial horizon instrument or operates the rate of climb indicator responsive to the inclination of the path of the simulated flight from the horizontal and therefore the angle $\epsilon_1$ between the brush 603 and the $y$ axis of such potentiometer is always proportional to the angle of climb or dive of the simulated flight. As the brushes of potentiometer P16 move over the windings of such potentiometer the potential $As_1$ applied to its windings is fractionated in accordance with the angular position $\epsilon_1$ of the brush 603, the potentials resulting at the points of engagement of the brushes 602 and 603 with the windings being proportional to the $z_0$ and $hr$ coordinates of the flight position of the No. 1 trainer and may be expressed as $$-As_1 z_0 = -As_1 \text{ sine } \epsilon_1 \quad (8)$$
$$-As_1 h = -As_1 \text{ cosine } \epsilon_1$$

The potential $As_1 z_0$ is impressed upon the input circuit of amplifier $Az_1$ and the potential $As_1 h$ is impressed through the decoupling amplifier $Ad_3$ upon the primary winding of transformer T9, and the end terminals of the secondary winding of which are connected to the junction points between the windings of the sine-cosine potentiometer P17. The mid-point of the secondary windings of transformer T9 and the mid-points of the windings of potentiometer P17 are connected to ground. With the windings of the transformer T9 wound for unity transformation, the potential $As_1 h$ produces potentials at the junction points of the windings of potentiometer P17 for exciting such windings of equal magnitude and opposite polarities. The brushes 605 and 606 of potentiometer P17 are mounted on shaft 607 which may be driven by the motor of the trainer which operates the compass in response to the horizontal steering control. Therefore the angle $\alpha_1$ between the brush 605 and the $y$ axis of the potentiometer P17 is always proportional to the azimuth angle of the flight heading. As the brushes of potentiometer P17 move over the windings of such potentiometer the potentials $As_1 h$ applied to its windings is fractionated in accordance with the angular position $\alpha_1$ of the brush 605, the potentials resulting at the points of engagement of the brushes 605 and 606 with the windings of the potentiometer P17 being proportional to the $V_x$ and $V_y$ velocity components of the flight along the $x$ and $y$ axes respectively of the No. 1 trainer and may be expressed as $$V_x = -As_1 h \text{ sine } \alpha_1 \quad (9)$$
$$V_y = -As_1 h \text{ cosine } \alpha_1$$

The potentials $V_x$ and $V_y$ are impressed upon the input circuits of amplifiers $Ax_1$ and $Ay_1$. The output circuit of amplifier $Ax_1$ is connected with the control winding of the two-phase motor $Mx_1$ of a motor-generator set serving as an integrator. The other phase winding of the motor $Mx_1$ and one phase winding of the coupled generator $Gx_1$ are energized from the alternating current source AC through the windings of transformer T7. The other phase winding of the generator $Gx_1$ is connected to the feedback circuit of the amplifier $Ax_1$. The output circuits of the amplifiers $Ay_1$ and $Az_1$ are similarly connected to the control phase windings of motors $My_1$ and $Mz_1$ of the associated integrators, the output phase windings of the generators $Gy_1$ and $Gz_1$ of such integrators being similarly connected to the feedback circuits of the amplifiers $Ay_1$ and $Az_1$.

The shaft 660 of motor $Mx_1$ drives the brush 661 of potentiometer P36 through gear reduction box 662. The winding 663 of potentiometer P36 is energized from the secondary winding of transformer T7 in such manner that opposite potentials are applied to the opposite ends of said winding 663. Brush 661 is moved over winding 663 in accordance with the speed and time interval during which motor $Mx_1$ is operated by the potentials impressed on amplifier $Ax_1$. Accordingly, brush 661 selects a potential from the winding 663 proportional to the time integral of the potential from brush 605 of potentiometer P17 which is the integral of the function $As_1 h$ sine $X_1 = V_x$, and therefore represents the change in coordinate of the flight during the given time interval. The potential of brush 661 at any instant is indicative of the $-x_1$ coordinate of the flight path at that instant. This potential is impressed on summing amplifier $SAx$. In like manner potentials $-y_1$, and $-z_1$, are impressed upon the input circuits of the summing amplifiers $SAy$ and $SAz$ from potentiometers P37 and P38 operated from integrator motors $My_1$ and $Mz_1$ respectively. The function of the integrators is to change the potentials impressed upon the amplifiers $Ax_1$, $Ay_1$ and $Az_1$ which vary in accordance with the air speed or velocity into potentials impressed upon the summing amplifiers which shall vary in accordance with the coordinates of the position of the trainer in its simulated flight.

Other well-known types of integrators could be employed. For example, the circuits incoming to the amplifiers $Ax_1$, $Ay_1$ and $Az_1$ could be connected to the driving coils of wattmeters, the rotors of which are employed to drive brushes over the windings of potentiometers energized by alternating current, such brushes being connected to the input circuits of the summing amplifiers to impress potentials thereon varying with respect to the input potentials $-As_1x_0$, $-As_1y_0$ and $-As_1z_0$.

Similarly, with respect to the No. 2 trainer assumed to be conducting a simulated flight over the same terrain, the potentiometer P25 is supplied with potential from the source AC through the windings of power transformer T17 and the brush shaft 650 thereof is driven by the motor of the trainer which drives the air speed indicator. In response, therefore, to changes in the air speed of the simulated flight a potential is applied over the brush 651 of potentiometer P25 to the input circuit of the decoupling amplifier $Ad_2$. The output potential $As_2$ from the amplifier $Ad_2$ is impressed upon the primary winding of transformer T18 the end terminals of the secondary winding of which are connected to the junction points between the windings of the sine-cosine potentiometer P26.

The mid-point of the secondary winding of transformer T18 and the mid-points of the windings of the potentiometer P26 are connected to ground. With the windings of the transformer wound for unity transformation the potential derived by the position of brush 651 is applied to produce potentials of equal magnitude and opposite polarities at the junction points of the windings of potentiometer P26 for exciting such windings. The brushes 652 and 653 of potentiometer P26 are mounted on the shaft 654 which may be driven by the motor of the trainer which raises and lowers the horizon bar of the artificial horizon instrument of the trainer or which operates the rate of climb indicator and therefore the angle $\epsilon_2$ between the brush 653 and the $y$ axis of such potentiometer is always proportional to the angle of climb or dive of the simulated flight. As the brushes of potentiometer P26 move the potential $As_2$ applied to the windings of such potentiometer is fractionated in accordance with the angular position $\epsilon_2$ of the brush 653, the potentials resulting at the points of engagement of the brushes 652 and 653 with the windings of potentiometer P26 being proportional to the $z_0$ and $hr$ velocity of the flight of the No. 2 trainer and may be expressed as $$As_2z_0 = As_2 \text{ sine } \epsilon_2 \qquad (10)$$
$$As_2h = As_2 \text{ cosine } \epsilon_2$$

The potential $As_2z_0$ is impressed upon the input circuit of the amplifier $Az_2$ and the potential $As_2h$ is impressed through the decoupling amplifier $Ad_4$ upon the primary winding of transformer T19, the end terminals of the secondary winding of which are connected to the junction points between the windings of the sine-cosine potentiometer P27. The mid-point of the secondary winding of transformer T19 and the mid-points of the windings of potentiometer P27 are connected to ground. With the windings of transformer T19 wound for unity transformation the potential $As_2h$ produces potentials at the junction points of the windings of potentiometer P27 for exciting such windings which are of equal magnitude and opposite polarity. The brushes 655 and 656 of potentiometer P27 are mounted on shaft 657 which may be driven by the motor of the trainer which operates the compass in response to the horizontal steering control. Therefore, the angle $\alpha_2$ between the brush 655 and the $y$ axis of the potentiometer is always proportional to the azimuth angle of the flight course. As the brushes of the potentiometer P27 move the potential $As_2h$ applied to its windings is fractionated in accordance with the angular position $\alpha_2$ of the brush 655, the potentials resulting at the points of engagement of the brushes 655 and 657 with the windings of the potentiometer P27 being proportional to the $x_0$ and $y_0$ coordinates of the flight position of the No. 2 trainer and may be expressed as $$As_2x_0 = As_2h \text{ sine } \alpha_2 \qquad (11)$$
$$As_2y_0 = As_2h \text{ cosine } \alpha_2$$

The potentials $As_2x_0$ and $As_2y_0$ are impressed upon the input circuits of the amplifiers $Ax_2$ and $Ay_2$. The output potentials from the amplifiers $Ax_2$ and $Ay_2$ and $Az_2$ are integrated by the motor-generator sets $Mx_2Gx_2$, $My_2Gy_2$ and $Mz_2Gz_2$ and the potentiometers P46, P47 and P48 and are impressed upon the inputs of the summing amplifiers $SAx$, $SAy$ and $SAz$ as potentials $x_2$, $y_2$ and $z_2$. The resultant potentials derived from the summing amplifiers being the sums of the potentials impressed upon their input circuits, result in the potentials in accordance with the following equations $$x_2 - x_1 = x \qquad (12)$$
$$y_2 - y_1 = y$$
$$z_2 - z_1 = z$$

The output potentials from summing amplifiers $SAx$ and $SAy$ are impressed through the transformers T10 and T11 across the junction points between the windings of the sine-cosine potentiometers P32 and P33, are fractionated thereby and impressed upon the summing amplifiers $SA_{rh}$ and $SA\alpha$ whereby a potential is derived from the amplifier $SA\alpha$ for driving the motor $M\alpha$ which, through the reduction gear box 608, positions the brushes 609 and 610 of potentiometer P32 and brushes 611 and 612 of potentiometer P33 until the brushes 609 and 611 assume positions with respect to the $y$ axes of such potentiometers in which such a value of the angle $\alpha$ is obtained as will satisfy Equation 4 as fully described in connection with the modification disclosed in Fig. 2. At such time the input shaft 613 of the differential gear box 614 will have been rotated by the motor $M\alpha$ to a position indicative of the correct azimuth angle $\alpha$ of the flight path which the No. 1 trainer must fly to reach the No. 2 trainer and since the shaft 613 is connected by gearing 615, shaft 616 and gearing 617 with the input shaft 618 of differential gear box 619 the shaft 618 will be rotated an equal amount but will assume an angular position corresponding to the value $\alpha + 180°$.

At the same time the output potential from the summing amplifier $SA_{rh}$ will have a value proportional to the horizontal range $rh$ between the assumed flight positions of the two trainers. This potential is now applied through the windings of transformer T13 across the junction points between the windings of sine-cosine potentiometer P35 and with the coordinate potential $z$ applied from the summing aplifier $SAz$ through the winding of transformer T12 across the junction points between the windings of sine-cosine potentiometer P34. Such potentials are fractionated by the potentiometers P34 and P35 and impressed upon the summing amplifiers $SAr$ and $SA\epsilon$ whereby a potential is derived from the amplifier $SA\epsilon$ for driving the motor $M\epsilon$ which through the reduction gear box 700 positions the brushes 701 and 702 of potentiometer P24 and brushes 703 and 704 of potentiometer P25 until the brushes 701 and 703 assume positions with respect to the $y$ axes of such potentiometers in which such a value of the angle $\epsilon$ is attained as will satisfy Equation 6 as fully described in connection with the modification disclosed in Fig. 2. At such time the input shaft 705 of the differential gear box 706 will have been rotated by the motor $M_\epsilon$ to a position indicative of the correct elevation angle $\epsilon$ of the flight path which the No. 1 trainer must fly to reach the No. 2 trainer and since shaft 705 is connected by gearing 707, shaft 708 and gearing 709 with the input shaft 710 of differential gear box 711 the shaft 719 will be rotated an equal amount but will assume an angular position corresponding to the value $\epsilon + 180°$.

At the same time the output potential from the summing amplifier $SA_r$ will have a value proportional to the slant range $r$ or the actual distance between the flight positions of the two trainers. This potential is applied to the coils of the two range meters $R_1$ and $R_2$ associated respectively with the two trainers and, with the scales of these meters calibrated in terms of range, each trainee who is operating one of the trainers may at any instant determine the distance from his trainer to the other trainer.

The other input shaft 620 of the differential gear box 614 is connected through gearing 621 to the shaft 607 which, as previously described, is driven by the steering motor and thus at any instant assumes a position indicative of the bearing of the simulated flight of the No. 1 trainer. The differential gear box 614 is thus driven by the shafts 619 and 620 so that the output shaft 622 assumes a position corresponding to the azimuth angle $\alpha$ corrected by the instant value of the steering or yawing angle $\alpha_1$ or $\alpha_1 \pm \alpha$, which may be termed $\beta_1$ and correspondingly positions the brush 623 of the potentiometer P18. Similarly the other input shaft 624 of differential gear box 619 is connected through gearing 625 to the shaft 657 which, as previously described is driven by the steering motor of the No. 2 trainer and thus at any instant assumes a position indicative of the bearing of the simulated flight of the No. 2 trainer. The differential gear box 619 is thus driven by the shafts 618 and 624 so that the output shaft 626 assumes a position corresponding to the azimuth angle $\alpha + 180°$ corrected by the instant value of the steering angle $\alpha_2$ or $\alpha_2 \pm (\alpha + 180°)$ which may be termed $\beta_2$ and correspondingly positions the brush 627 of the potentiometer P22. With the windings of potentiometers P18 and P28 energized from the alternating current source AC potentials are derived at the brushes 623 and 627 of such potentiometers having the values $\pm \beta_1$ and $\pm \beta_2$ which include corrections for the yawing of the trainers in their simulated flights.

The other input shaft 712 of the differential gear box 706 is connected through gearing 713 to the shaft 694 which, as previously described, is driven by the motor which raises or lowers the horizon bar of the artificial horizon instrument of the No. 1 trainer and thus at any instant assumes a position indicative of the angle of pitch of such trainer. The differential gear box 706 is thus driven by the shafts 705 and 712 so that the output shaft 714 assumes a position corresponding to the elevation angle $\epsilon$ corrected by the instant value of the angle of pitch $\epsilon_1$ or $\epsilon_1 \pm \epsilon$ which may be termed $\omega_1$ and correspondingly positions the brush 715 of the potentiometer P19. Similarly, the other input shaft 716 of differential gear box 711 is connected through gearing 717 to the shaft 654 which, as previously described, is driven by the motor which raises or lowers the horizon bar of the artificial horizon instrument of the No. 2 trainer and thus at any instant assumes a position indicative of the angle of pitch of such trainer. The differential gear box 711 is thus driven by the shafts 710 and 716 so that the output shaft 718 assumes a position corresponding to the elevation angle $\epsilon$ corrected by the instant value of the angle of pitch $\epsilon_2$ or $\epsilon_2 \pm (\epsilon + 180°)$ which may be termed $\omega_2$ and correspondingly positions the brush 719 of the potentiometer P29. With the windings of potentiometers P19 and P29 energized by the source of alternating current AC potentials are derived at the brushes 715 and 719 of such potentiometers having the values $\pm \omega_1$ and $\pm \omega_2$ which include corrections for the pitching of the trainers in their simulated flights.

The potentials $\beta_1$ and $\omega_1$ and $\beta_2$ and $\omega_2$ could be applied directly across the horizontal and vertical plates of the oscilloscope OSC1 and OSC2, respectively to control the positions of the images $I_1$ and $I_2$ on the screens indicating the location of each trainer with respect to the other but it is also desirable to simulate the change in the image position as affected by the control of the trainers to simulate rolls or banks. This is accomplished with respect to the No. 1 trainer by connecting the brush 623 of potentiometer P18 shown in Fig. 6 and brush 715 of potentiometer P19 of Fig. 7 to the input circuits of amplifiers A1 and A3, the output circuits of which amplifiers are connected to the primary windings of transformers T14 and T15. The end terminals of the secondary windings of transformers T14 and T15 are connected to the junction points between the windings of the sine-cosine potentiometers P20 and P21. The transformers have unity transformation and the mid-points of their secondary windings and the mid-points of the windings of the potentiometers P20 and P21 are connected to ground. The brushes 720 and 721 of potentiometer P20 and the brushes 722 and 723 of potentiometer P21 are mounted on the same shaft 724 which may be turned by the motor which controls the tilting of the horizon bar of the artificial horizon instrument of the trainer. At any instant the brushes 721 and 722 will assume a position with respect to the $y$ axes of the potentiometers equal to the angle of roll $\delta_1$.

The movement of the brushes of potentiometers P20 and P21 fractionates the input potentials $\beta_1$ and $\omega_1$ and applies the instant potentials on brushes 720 and 722, $\pm \omega_1$ sine $\delta_1$ and $\pm \beta_1$ cosine $\delta_1$ upon the input circuit of summing amplifier $SA_{1cc}$ and such amplifier will add these potentials and apply the result through the modulator M1 across the horizontal plates of the oscilloscope OSC1. At the same time the instant potentials of brushes 721 and 723, $\pm \beta_1$ sine $\delta_1$ and $\pm \omega_1$ cosine $\delta_1$ are applied upon the input circuit of summer amplifier $SA_{1cc}$ and such amplifiers will add these potentials and apply the result through the modulator M3 across the vertical plates of the oscilloscope OSC1.

At any instant therefore the image spot $I_1$ on the screen of location oscilloscope OSC1 indicates the bearing of the flight position of the No. 2 trainer with respect to the flight position of the No. 1 trainer. If now the trainee operates the steering controls of the trainer until the image spot $I_1$ becomes centered on the screen of the oscilloscope the No. 1 trainer would be flying a simulated course directly toward the No. 2 trainer and in an aircraft equipped with radio location equipment this would be the instant to fire a fixed gun carried by the aircraft since only at this instant would the gun be trained upon the target whose image appears on the screen of the radio locator.

Similarly the potentials $\beta_2$ and $\omega_2$ derived at the brushes 627 and 719 of potentiometers P28 and P29 are applied to the input circuits of amplifiers A2 and A4, the output circuits of which amplifiers are connected to the primary windings of transformers T24 and T25. The end terminals of the secondary windings of transformers T24 and T25 are connected to the junction points between the windings of the sine-cosine potentiometers P30 and P31. These transformers have unity transformation and the mid-points of their secondary windings and the mid-points of the windings of the potentiometers are connected to ground. The brushes 725 and 726 of potentiometer P30, and the brushes 727 and 728 of potentiometer P31 are mounted on the same shaft 729 which may be turned by the motor which controls the tilting of the horizon bar of the artificial horizon instrument of the No. 2 trainer. At any instant the brushes 726 and 727 will assume a position with respect to the $y$ axes of the potentiometers equal to the angle of roll $\delta_2$.

The movement of the brushes of the potentiometers P30 and P31 fractionates the input potentials $\beta_2$ and $\omega_2$ and applies the instant potentials on brushes 725 and 727, $\pm\omega_2$ sine $\delta_2$ and $\pm\beta_1$ cosine $\delta_2$ upon the input circuit of summing amplifier SA2αc and such amplifier will add these potentials and apply the result through the modulator M2 across the horizontal plates of the oscilloscope OSC2. At the same time the instant potentials on brushes 726 and 728 $\pm\beta_2$ sine $\delta_2$ and $\pm\omega_2$ cosine $\delta_2$ are applied upon the input circuit of summing amplifier SA2ec and such amplifier will add these potentials and apply the result through the modulator M4 across the vertical plates of the oscilloscope OSC2.

At any instant therefore the image spot $I_2$ on the screen of location oscilloscope OSC2 indicates the general bearing of the flight position of the No. 1 trainer with respect to the flight position of the No. 2 trainer. If now the trainee operates the steering controls of the trainer until the image spot $I_2$ becomes centered on the screen of the oscilloscope the No. 2 trainer would be flying a simulated course directly toward the No. 1 trainer.

Apparatus for simulating the firing of a gun carried by either trainer when the trainer is flying a course directly toward the other trainer, has been omitted from Fig. 7 but apparatus similar to that disclosed in Fig. 2 or other equivalent apparatus could be used equally well with the apparatus of Fig. 7.

While the system disclosed in Figs. 6 and 7 is shown as operating on alternating current it would be equally operable on direct current by replacing the transformers with reversing amplifiers. In the alternating current system disclosed in Figs. 6 and 7 the sine-cosine potentiometers could be replaced by magnetic resolvers of the well-known type.

What is claimed is:

1. In an aircraft trainer operable by a trainee in simulation of flight, means for determining the instant values of the Cartesian coordinates of the simulated changing position of the trainer in its simulated flight, means for determining the values of the Cartesian coordinates of the simulated position of a simulated objective, means for combining said coordinates and resolving the results into potentials representative of the distance and azimuth and elevation angles of the path from the simulated flight position of the trainer to the objective, and indicating means operable in response to the distance and azimuth and elevation angle potentials to indicate the instant distance to the objective and the instant position of the objective with respect to the simulated line of flight of the trainer.

2. In an aircraft trainer operable by a trainee in simulation of flight, means for determining the instant values of the Cartesian coordinates of the simulated changing position of the trainer in its simulated flight, means for determining the values of the Cartesian coordinates of the simulated position of a simulated objective, means for combining said coordinates and resolving the results into potentials representative of the distance and azimuth and elevation angles of a path from the simulated flight position of the trainer to the objective, a first indicator operable in response to said distance potential to indicate the instant distance to the objective, and a second indicator operable in response to the azimuth and elevation angle potentials to indicate the instant position of the objective with respect to the line of simulated flight of the trainer.

3. In an aircraft trainer operable by a trainee in simulation of flight, means for determining the instant values of the Cartesian coordinates of the simulated changing position of the trainer in its simulated flight, means for determining the values of the Cartesian coordinates of the simulated position of a simulated objective, means for combining said coordinates and resolving the results into potentials representative of the distance and azimuth and elevation angles of a path from the simulated flight position of the trainer to the objective, a first indicator operable in response to said distance potential to indicate the instant distance to the objective, a second indicator operable in response to the azimuth and elevation angle potentials to indicate the instant position of the objective with respect to the line of simulated flight of the trainer, and means to modify the operation of said second indicator in response to the simulated deviation of the trainer from straight line flight.

4. In an aircraft trainer operable by a trainee in simulation of flight, means for determining the instant values of the Cartesian coordinates of the simulated changing position of the trainer in its simulated flight, means for determining the values of the Cartesian coordinates of the simulated position of a simulated target, means for combining said coordinates and resolving the results into potentials representative of the distance and azimuth and elevation angles of a path from the simulated flight position of the trainer to the target, a first indicator operable in response to said range potential to indicate the instant range, a second indicator having a screen operable in response to the azimuth and elevation angle potentials to indicate the instant position of the target with respect to the line of simulated flight of the trainer, a key operable to simulate the firing of a gun at the target and means operable by said key when said target position is at a predetermined point on the screen of said second indicator to alter the vertical coordinate of said result whereby the target position on the screen of said second indicator is depressed to indicate the target as hit and falling.

5. In an aircraft trainer operable by a trainee in simulation of flight, means for determining the instant values of the Cartesian coordinates of the simulated changing position of the trainer in its simulated flight, means for determining the instant values of the Cartesian coordinates of the simulated changing position of a moving objective, means for combining said coordinates and resolving the results into potentials representative of the distance and azimuth and elevation angles of a path from the simulated flight position of the trainer to the objective, a first indicator operable in response to said distance potential to indicate the instant distance to the objective and a second indicator operable in response to the azimuth and elevation angle potentials to indicate the instant position of the objective with respect to the line of simulated flight of the trainer.

6. In combinaion, a first aircraft trainer operable by a first trainee in simulation of flight, means for determining the instant values of the Cartesian coordinates of the simulated changing position of the trainer in its simulated flight, a second aircraft trainer, operable by a second trainee in simulation of flight, means for determining the instant values of the Cartesian coordinates of the simulated changing position of said second trainer in its simulated flight, means for combining said coordinates and resolving the results into potentials representative of the range and azimuth and elevation angles of the path from the simulated flight position of the first trainer to the simulated flight position of the second trainer, a first indicator operable in response to said range potential to indicate the instant range between the flight positions and a second indicator operable in response to the indicated azimuth and location angle potentials to indicate the instant flight position of the second trainer with respect to the line of simulated flight of said first trainer.

7. In combination, a first aircraft trainer operable by a first trainee in simulation of flight, means for determining the instant values of the Cartesian coordinates of the simulated changing position of the trainer in its simulated flight, a second aircraft trainer, operable by a second trainee therein in simulation of flight, means for determining the instant values of the Cartesian coordinates of the simulated changing position of the second trainer in its simulated flight, means for combining said coordinates and resolving the results into potentials representative of the range and azimuth and elevation angles of the path between the simulated flight position of the first trainer and the simulated flight position of the second trainer, and means operated in response to said range and azimuth and elevation angle potentials to indicate the range between the flight positions of said trainers and to indicate the flight position of each trainer with respect to the other trainer.

8. An aircraft trainer operable by a trainee in simulation of flight, means for determining the instant values of the Cartesian coordinates of the simulated changing position of the trainer in simulated flight, means for determining the values of the Cartesian coordinates of the simulated position of an objective, means for combining said coordinates and resolving the results into potentials representative of the distance and azimuth and elevation angles of a flight path from the simulated flight position of the trainer to the objective, a first indicator operable in response to the distance potential to indicate the distance, a second indicator operable in response to the azimuth and elevation angle potentials to indicate the position of the objective with respect to the line of simulated flight of the trainer, and means to modify the operation of said second indicator in response to the simulated deviation of the trainer from straight line flight.

9. In combination, a first aircraft trainer operable by a first trainee in simulation of flight, means for determining the instant values of the Cartesian coordinates of the simulated changing position of the trainer in its simulated flight, a second aircraft trainer, operable by a second trainee in simulation of flight, means for determining the instant values of the Cartesian coordinates of the simulated changing position of said second trainer in its simulated flight, means for combining said coordinates and resolving the results into potentials representative of the range and azimuth and elevation angles of the path from the simulated flight position of the first trainer to the simulated flight position of the second trainer, means associated with each of said trainers operable in response to said range and azimuth and elevation angle potentials to indicate the range between the flight positions of said trainers and to indicate the flight position of each trainer with respect to the other trainer, and means to modify the operation of said indicating means in response to the simulated deviation of the trainers from straight line flight.

10. In combination, a first aircraft trainer operable by a first trainee in simulation of flight, means for determining the instant values of the Cartesian coordinates of the simulated changing position of the trainer in its simulated flight, a second aircraft trainer, operable by a second trainee in simulation of flight, means for determining the instant values of the Cartesian coordinates of the simulated changing position of said second trainer in its simulated flight, means for combining said coordinates and resolving the results into potentials representative of the range and azimuth and elevation angles of the path from the simulated flight position of the first trainer to the simulated flight position of the second trainer, a first indicator associated with each trainer operable in response to the range potential to indicate the distance between the flight positions of said trainers, a second indicator associated with each trainer operable in response to the azimuth and elevation angle potentials to indicate the flight position of the other trainer with respect to the flight position of the trainer with which the latter indicator is associated, and means for modifying the operation of the second indicator of each trainer in response to the simulated deviation of such trainer from straight line flight.

11. In an aircraft trainer operable by a trainee in simulation of flight, means for determining the instant values of the Cartesian coordinates of the simulated changing position of the trainer in simulated flight, means for determining the values of the Cartesian coordinates of the simulated position of an objective, means for combining said coordinates and resolving the results into potentials representative of the distance and azimuth and elevation angles of a flight path from the simulated flight position of the trainer to the objective, a first indicator operable in response to the distance potential to indicate the instant distance, a second indicator operable in response to the azimuth and elevation angle potentials to indicate the instant position of the objective with respect to the line of simulated flight of the trainer, and means to modify the operation of said second indicator in response to the simulated yawing, pitching and rolling of the trainer with respect to the straight line flight path from the trainer to the objective.

12. In an aircraft trainer operable by a trainee in simulation of flight, means for determining the instant values of the Cartesian coordinates of the simulated changing position of the trainer in its simulated flight, means for determining the instant values of the Cartesian coordinates of the simulated changing position of a moving objective, means for combining said coordinates and resolving the results into polar coordinate potentials representative of the distance and azimuth and elevation angles of a path from the simulated flight position of the trainer to the objective, a first indicator operable in response to said distance potential to indicate the instant distance, and a second indicator operable in response to the azimuth and elevation angle potentials to indicate the instant position of the objective with respect to the line of simulated flight of the trainer.

13. In an aircraft trainer operable by a trainee in simulation of flight, means for determining the instant values of the Cartesian coordinates of the simulated changing position of the trainer in simulated flight, means for determining the instant values of the Cartesian coordinates of the simulated changing position of a moving objective, means for subtracting said coordinates and resolving the remainders into the polar coordinate potentials representative of the distance and azimuth and elevation angles of a path from the simulated flight position of the trainer to the objective, a first indicator operable in response to said distance potential to indicate the instant distance, a second indicator operable in response to the azimuth and elevation angle potentials to indicate the instant position of the objective with respect to the line of simulated flight of the trainer, and means to modify the operation of said second indicator in response to the simulated deviation of the trainer from straight line flight.

14. In an aircraft trainer operable by a trainee in simulation of flight, means for determining the instant values of the Cartesian coordinates of the simulated changing position of the trainer in the simulated flight, means for determining the instant values of the Cartesian coordinates of the simulated changing position of a moving target, means for subtracting said coordinates and resolving the remainders into the polar coordinate potentials representative of the range and azimuth and elevation angles of a path from the simulated flight position of the trainer to the target, a first indicator operable in response to said range potential to indicate the instant range, a second indicator having a screen operable in response to the azimuth and elevation angle potentials to indicate the instant position of the target with respect to the line of simulated flight of the trainer, and a key operable to simulate the firing of a gun at the target and operable when said target position is at a predetermined position adjustable at will on the screen of said second indicator to alter the vertical coordinate of said result whereby the target position on the screen of said second indicator is depressed to indicate the target as hit and falling.

15. In an aircraft trainer operable by a trainee in simulation of flight, means in said trainer for charting the course of the simulated flight, means operable by said charting means for determining potentials the instant values of which are proportional to the $x$ and $y$ coordinates of the instant chartered position of the trainer, means in said trainer for indicating the altitude at which the simulated flight is being made, means operable by said latter means for determining a potential the instant value of which is proportional to the $z$ coordinate of the instant simulated altitude position of the trainer, means for determining potentials proportional to the $x$, $y$ and $z$ coordinates of the position of an objective, summing amplifiers for combining the corresponding coordinate potentials and resolving the results into potentials representative of the distance and azimuth and elevation angles of a path from the simulated flight position of the trainer to the objective, a first indicator operable in response to said distance potential to indicate the instant distance to the objective, and a second indicator operable in response to the azimuth and elevation angle potentials to indicate the instant position of the objective with respect to the line of simulated flight of the trainer.

16. In combination, a first aircraft trainer operable by a first trainee in simulation of flight, means in said trainer for charting the course of the simulated flight, means operable by said charting means for determining potentials the instant values of which are proportional to the $x$ and $y$ coordinates of the instant charted position of the trainer, means in said trainer for indicating the altitude at which the simulated flight is being made, means operable by said latter means for determining a potential the instant value of which is proportional to the $z$ coordinate of the instant simulated altitude position of the trainer, a second aircraft trainer operable by a second trainee in simulation of flight, means in said second trainer for charting the course of the simulated flight, means operable by said latter charting means for determining potentials the instant values of which are proportional to the $x$ and $y$ coordinates of the instant charted position of the second trainer, means in said second trainer for indicating the altitude at which the simulated flight is being made, means operable by said latter means for determining a potential the instant value of which is proportional to the $z$ coordinate of the instant simulated altitude position of the second trainer, summing amplifiers for combining the corresponding coordinate potentials and resolving the results into potentials representative of the range and azimuth and elevation angles of a path from the simulated flight position of the first trainer to the simulated flight position of the second trainer, a first indicator operable in response to said range potential to indicate the instant range between the flight positions, and a second indicator operable in response to the azimuth and elevation angle potentials to indicate the instant flight position of the second trainer with respect to the line of simulated flight of said first trainer.

17. In an aircraft trainer operable by a trainee in simulation of flight, means for determining potentials proportional to the instant values of the $x$, $y$ and $z$ coordinates of the simulated changing position of the trainer in its simulated flight, means for determining potentials proportional to the values of the $x$, $y$ and $z$ coordinates of the simulated position of an objective, summing amplifiers for combining the corresponding coordinate potentials, motor driven potentiometers operable in response to the output potentials of said amplifiers for producing potentials proportional to the distance and azimuth and elevation angles of a flight path from the simulated flight position of the trainer to the objective, a first indicator operable in response to said distance potential to indicate the instant distance to the objective and a second indicator operable in response to the azimuth and elevation angle potentials to indicate the instant position of the objective with respect to the line of simulated flight of the trainer.

18. In an aircraft trainer operable by a trainee in simulation of flight, means for determining potentials proportional to the instant values of the $x$, $y$ and $z$ coordinates of the simulated changing position of the trainer in its simulated flight, means for determining potentials proportional to the values of the $x$, $y$ and $z$ coordinates of the simulated position of an objective, summing amplifiers for combining the corresponding coordinate potentials, a first pair of sinusoidal potentiometers responsive respectively to the output potentials of two of said summing amplifiers for converting said potentials into a potential proportional to the horizontal range from the simulated flight position of said trainer to said objective and into a potential proportional to the azimuth angle of the flight path to said objective, a second pair of sinusoidal potentiometers responsive respectively to the output potentials of the third of said summing amplifiers and to the horizontal range potential for converting said potentials into a potential proportional to the slant range and into a potential proportional to the elevation angle of the flight path, a first indicator operable in response to said slant range potential to indicate the instant slant range between said trainer and the objective and a second indicator operable in response to the azimuth and elevation angle potentials to indicate the instant position of the objective with respect to the line of simulated flight of the trainer.

19. In an aircraft trainer operable by a trainee in the simulated flight of an aircraft, means for determining potentials proportional to the instant values of the $x$, $y$ and $z$ coordinates of the simulated changing position of the trainer in its simulated flight, means for determining potentials proportional to the values of the $x$, $y$ and $z$ coordinates of the simulated position of an objective, summing amplifiers for combining the corresponding coordinate potentials, motor driven shafts, potentiometers driven by said shafts and operable in response to the output potentials of said amplifiers whereby the potentiometer shafts assume angular displacements proportional to the azimuth and elevation angles of the flight path from the simulated flight position of the trainer to the objective, a first potentiometer energized from a source of potential and having its brushes carried by one of said shafts and having its winding rotatable about the axis of its brush shaft in response to the simulation of the steering of said aircraft, a second potentiometer having its brushes carried by the other of said shafts and having its winding energized from a source of potential and rotatable about the axis of its brush shaft in response to the simulation of the climbing or diving movements of said aircraft, and an oscilloscope operable in response to the potentials determined by said latter potentiometers to indicate the instant position of the objective with respect to the line of simulated flight of the trainer.

20. In an aircraft trainer operable by a trainee in simulation of the flight of an aircraft, means for determining the instant values of the Cartesian coordinates of the simulated changing position of the trainer in its simulated flight, means for determining the values of the Cartesian coordinates of the simulated position of an objective, means for combining said coordinates and resolving the results into potentials representative of the azimuth and elevation angles of a path from the simulated flight position of the trainer to the objective, a pair of sinusoidal potentiometers, means for applying said azimuth and elevation angle potentials across the diametrically opposite points of said potentiometer windings, means for rotating the brushes of said potentiometers in proportion to the simulated angle of roll of said aircraft about its longitudinal axis, means for applying the output potentials of said potentiometers to summing amplifiers, and an oscilloscope responsive to the output potentials of said amplifiers to indicate the position of the objective with respect to the line of simulated flight of the trainer.

21. In an aircraft trainer operable by a trainee in simulation of the flight of an aircraft, means for determining the instant values of the Cartesian coordinates of the simulated changing position of the trainer in its simulated flight, means for determining the values of the Cartesian coordinates of the simulated position of an objective, means for combining said coordinates and resolving the results into potentials representative of the azimuth and elevation angles of a path from the simulated flight position of the trainer to the objective, means controlled in response to the simulation of the steering of an aircraft to modify the azimuth angle potential, means controlled in response to the simulation of the climbing or diving of said aircraft to modify the elevation angle potential, a pair of sinusoidal potentiometers, means for applying said modified azimuth and elevation angle potentials across the diametrically opposite points of said respective potentiometer windings, means for producing relative rotation between the brushes and windings of said potentiometers in proportion to the simulated angle of roll of said aircraft about its longitudinal axis, means for applying the output potentials of said potentiometers to summing amplifiers, and an oscillograph responsive to the output potentials of said amplifiers to indicate the position of the objective with respect to the line of simulated flight of the trainer.

22. In an aircraft trainer operable by a trainee in simulation of flight, means for determining potentials proportional to the instant values of the $x$, $y$ and $z$ coordinates of the simulated changing position of the trainer in its simulated flight, means for determining potentials proportional to the values of the $x$, $y$ and $z$ coordinates of the simulated position of a target, summing amplifiers for combining the corresponding coordinate potentials, means responsive to the output potentials of said amplifiers for producing potentials proportional to the azimuth and elevation angles of a flight path from the simulated flight position of the trainer to the target, an oscilloscope operable in response to said azimuth and elevation angle potentials to indicate the position of the target with respect to the simulated line of flight of the trainer, a first relay operable by the azimuth angle potential, a second relay operable by the elevation angle potential, the movable contact of each of said relays being operable between fixed contacts and the movable contacts of both relays being out of engagement with their contacts when the azimuth and elevation angle potentials are of such values as to position the beam image of the target in the center of the oscilloscope screen, a key for simulating the trigger release of a gun, a third relay normally operated under the control of said key and releasable upon the operation of said key if the movable contacts of said first and second relays are in their mid-positions, and means controlled by the release of said third relay for decreasing the value of the potential corresponding to the z coordinate of the position of the target whereby the elevation angle potential is changed to cause said oscilloscope to indicate a hit and falling target.

23. In an aircraft trainer operable by a trainee in simulation of flight, means for determining potentials proportional to the instant values of the $x$, $y$ and $z$ coordinates of the simulated changing position of the trainer in the simulated flight, means for determining potentials proportional to the values of the $x$, $y$ and $z$ coordinates of the simulated position of a target, summing amplifiers for combining the corresponding coordinate potentials, means responsive to the output potentials of said amplifiers for producing potentials proportional to the range and to the azimuth and elevation angles of a flight path from the simulated flight position of the trainer to the target, a first indicator operable in response to said range potential to indicate the range, an oscilloscope responsive to said azimuth and elevation angle potentials to indicate the position of the target with respect to the line of simulated flight of the trainer, a first relay operable by the azimuth angle potential, a second relay operable by the elevation angle potential, the movable contact of each of said relays being operable between fixed contacts and the movable contacts of both relays being out of engagement with their contacts when the azimuth and elevation angle potentials are of such values as to position the image of the target in the center of the oscilloscope screen, a key for simulating the trigger release of a gun, a third relay normally operated under the control of said key and releasable upon the operation of said key if the movable contacts of said first and second relays are in their mid-positions, and means controlled by the release of said third relay for decreasing the value of the potential corresponding to the z coordinate of the position of the target whereby said indicator is controlled to show a changed range to the target and said oscilloscope is controlled to indicate the target as hit and falling.

24. In an aircraft trainer operable by a trainee in simulation of flight, an oscilloscope, means for producing an image on the screen of said oscilloscope indicative of the position of a target with respect to the simulated line of flight of said trainer, means controlled in the operation of said trainer in simulation of flight to control said oscilloscope to position said image at a predetermined point on said screen indicative of the coincidence of the simulated flight path of the trainer with the direction of the slant range from the trainer to the target, a key for simulating the trigger release of an aircraft borne gun, and means controlled by said key to depress the position of the target image on the screen of said oscilloscope to simulate a hit and falling target only if said target image is coincident with said point on said screen.

25. In combination, a first aircraft trainer, operable by a first trainee in simulation of flight, elements in said trainer movable in accordance with the simulated air speed, the climb or dive angle and the direction of the simulated flight, potentiometers operable by said elements and interconnected to derive potentials corresponding to the Cartesian coordinates of the air speed of the simulated flight, means for integrating said potentials to produce potentials corresponding to the Cartesian coordinates of the simulated flight position of said trainer in its simulated flight, a second trainer operable by a second trainee in simulation of flight, elements in said second trainer movable in accordance with the simulated air speed, the climb or dive angle and the direction of the simulated flight, of said second trainer, potentiometers operable by said shafts and interconnected to derive potentials corresponding to the Cartesian coordinates of the air speed of the simulated flight, means for integrating said potentials to produce potentials corresponding to the Cartesian coordinates of the flight position of said second trainer in its simulated flight, means for combining said coordinate position potentials and for resolving the results into potentials representative of the range and azimuth and elevation angles of the path between the simulated flight position of the first trainer and the simulated flight position of the second trainer, and means associated with each trainer responsive to said range and azimuth and elevation angle potentials for indicating the range between the flight positions of said trainers and to indicate the flight position of each trainer with respect to the other trainer.

26. In an aircraft trainer operable by a trainee in simulated flight, a shaft responsive to the lateral steering control of said trainer, a shaft responsive to the vertical steering control of said trainer, means for determining potentials proportional to the instant values of the $x$, $y$ and $z$ coordinates of the simulated changing position of the trainer in its simulated flight, means for determining potentials proportional to the values of the $x$, $y$ and $z$ coordinates of the simulated position of an objective, summing amplifiers for combining the corresponding coordinate potentials, motor driven shafts operable in response to the output potentials of said amplifiers whereby said shafts assume angular displacements proportional to the azimuth and elevation angles of the flight path from the simulated flight position of the trainer to the objective, a first differential gear box having one of its input shafts driven by one of said motor driven shafts and having its second input shaft driven by the shaft of said trainer which responds to the lateral steering thereof, a first potentiometer operable by the output shaft of said gear box, a second differential gear box having one of its input shafts driven by the other of said motor driven shafts and having its second input shaft driven by the shaft of said trainer which responds to the vertical steering thereof, a second potentiometer operable by the output shaft of said latter gear box and an oscilloscope operable in accordance with the potentials determined by said potentiometers to indicate the position of the objective with respect to the flight position of the trainer.

27. In combination, a first aircraft trainer operable by a first trainee in simulated flight, a shaft responsive to the lateral steering control of said trainer, a shaft responsive to the vertical steering control of said trainer, means for determining potentials proportional to the instant values of the $x$, $y$ and $z$ coordinates of the simulated changing position of the trainer, a second aircraft trainer operable by a second trainee in simulated flight, a shaft responsive to the lateral steering control of said second trainer, a shaft responsive to the vertical steering control of said second trainer, means for determining potentials proportional to the instant values of the $x$, $y$ and $z$ coordinates of the simulated changing position of said second trainer, summing amplifiers for combining the corresponding coordinate potentials, motor driven shafts operable in response to the output potentials of said amplifiers whereby said shafts assume angular displacements proportional to the azimuth and elevation angles of the flight path from the simulated flight position of the first trainer to the simulated flight position of the second trainer, a first pair of differential gear boxes allocated to said first trainer having input shafts driven by said motor driven shafts respectively, one of said gear boxes having its other input shaft driven from the shaft of said first trainer which responds to the lateral steering control thereof and the other of said gear boxes having its other input shaft driven from the shaft of said first trainer which responds to the vertical steering thereof, a second pair of differential gear boxes allocated to said second trainer having input shafts driven from said motor driven shafts respectively, one of said latter gear boxes having its other input shaft driven from the shaft of said second trainer which responds to the lateral steering thereof and the other of said gear boxes having its other input shaft driven from the shaft of said second trainer which responds to the vertical steering thereof, a first pair of potentiometers driven by the output shafts of said first pair of gear boxes, a first oscilloscope operable in accordance with the potentials determined by said first pair of potentiometers to indicate the flight position of said second trainer with respect to the flight position of said first trainer, a second pair of potentiometers driven by the output shafts of said second pair of gear boxes and a second oscilloscope operable in accordance with the potentials determined by said second pair of potentiometers to indicate the flight position of said first trainer with respect to the flight position of the second trainer.

RICHARD C. DEHMEL.

REFERENCES CITED

The following references are of record in the file of this patent:

UNITED STATES PATENTS

| Number | Name | Date |
|---|---|---|
| 1,402,498 | Horn | Jan. 3, 1922 |
| 1,574,350 | Johnson | Feb. 23, 1926 |
| 2,089,901 | Kollmayer | Aug. 10, 1937 |
| 2,110,869 | Crane | Mar. 15, 1938 |
| 2,114,283 | Anderson | Apr. 19, 1938 |
| 2,212,931 | Colvin | Aug. 27, 1940 |
| 2,216,707 | George | Oct. 1, 1940 |
| 2,230,149 | Weddington | Jan. 28, 1941 |
| 2,296,032 | Hammond | Sept. 15, 1942 |
| 2,298,305 | Muller | Oct. 13, 1942 |
| 2,301,685 | De Florez | Nov. 10, 1942 |
| 2,308,566 | Noxon | Jan. 19, 1943 |
| 2,346,693 | Lyman | Apr. 18, 1944 |
| 2,389,359 | Grow | Nov. 20, 1945 |
| 2,404,387 | Lovell et al. | July 23, 1946 |

FOREIGN PATENTS

| Number | Country | Date |
|---|---|---|
| 418,224 | Great Britain | 1933 |

Disclaimer 2,471,315.—*Richard C. Dehmel*, Summit, N. J. AIRCRAFT TRAINER FOR AERIAL GUNNERS. Patent dated May 24, 1949. Disclaimer filed Dec. 21, 1951, by the assignee, *Bell Telephone Laboratories, Incorporated*.

Hereby enters this disclaimer to claims 1, 2, 3, 5, 8, 11, 12, and 13 of said patent.

[*Official Gazette January 22, 1952.*]